US006509912B1

(12) United States Patent
Moran et al.

(10) Patent No.: US 6,509,912 B1
(45) **Date of Patent: *Jan. 21, 2003**

(54) DOMAIN OBJECTS FOR USE IN A FREEFORM GRAPHICS SYSTEM

(75) Inventors: Thomas P. Moran, Palo Alto, CA (US); William J. van Melle, Los Altos, CA (US); Patrick Chiu, Menlo Park, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/005,978

(22) Filed: Jan. 12, 1998

(51) Int. Cl.[7] .................................................. G09G 5/00

(52) U.S. Cl. ....................... 345/762; 345/763; 345/826; 345/825

(58) Field of Search ................................ 345/334, 348, 345/433, 358, 711–715, 724, 731, 732, 856, 857, 762, 763, 825, 826, 744–777, 723–726, 788, 802, 747; 705/8, 9, 12, 1

(56) References Cited

U.S. PATENT DOCUMENTS

| | | | | |
|---|---|---|---|---|
| 4,905,147 A | | 2/1990 | Logg | 364/410 |
| 5,220,649 A | | 6/1993 | Forcier | 395/148 |
| 5,287,447 A | * | 2/1994 | Miller et al. | 345/342 |
| 5,299,307 A | * | 3/1994 | Young | 345/157 |

(List continued on next page.)

FOREIGN PATENT DOCUMENTS

| | | |
|---|---|---|
| EP | 0 667 567 A2 | 8/1995 |
| EP | 0 816 999 A2 | 1/1998 |

OTHER PUBLICATIONS

Microsoft Paintbrush Userguide, Mircorsoft Corporation, © 1986.*

Building applications Microsoft Access, Microsoft Corporation, ©1994, pp. 241–267.*

Moran et al., "Pen–based interaction techniques for organizing material on an electronic whiteboard", proceedings of the ACM Symposium on User Interface Software and Technology. 10th Annual Symposijm UIST '97, Proceedings of Tenth Annual Symposium on User Interface Software and Technology, Banff, Alta., Canada, Oct. 14–17, 1997, pp. 45–54.

Kaiya et al., "Design of a Hyper Media Tool to support Requirements Elicitaion Meetings", proceedings of the 7th International Workshop on Computer–Aided Software Engineering, Toronto Canada, Jul. 10–14, 1995, pp. 250–259.

(List continued on next page.)

*Primary Examiner*—Kristine Kincaid
*Assistant Examiner*—Thomas J Joseph

(57) ABSTRACT

Domain objects for use in a freeform graphics system. Domain objects are context specific representations of information that are used in a freeform graphics system. Domain objects are represented in a freeform graphics system by a graphic object (icon) representing an instance of the domain object. The icon representing a domain object may be manipulated like any other graphic object. Domain objects are defined by a domain object class which define attributes, a set of action rules and layouts. The attributes describe the information or data associated with the domain object. The set of action rules map user actions and system events to operations that may be performed on the domain object. The layouts define how domain object information is displayed as an icon.

16 Claims, 22 Drawing Sheets

U.S. PATENT DOCUMENTS

| | | | | | |
|---|---|---|---|---|---|
| 5,325,477 | A | * | 6/1994 | Klassen et al. | 345/442 |
| 5,347,295 | A | | 9/1994 | Agulnick et al. | 345/156 |
| 5,377,355 | A | | 12/1994 | Hager et al. | 395/650 |
| 5,428,776 | A | * | 6/1995 | Rothfield | 345/348 |
| 5,479,589 | A | * | 12/1995 | Peterson | 345/433 |
| 5,542,024 | A | | 7/1996 | Balint et al. | 395/161 |
| 5,548,705 | A | * | 8/1996 | Moran et al. | 345/433 |
| 5,555,369 | A | * | 9/1996 | Menendez et al. | 345/762 |
| 5,572,639 | A | * | 11/1996 | Gantt et al. | 345/333 |
| 5,586,317 | A | | 12/1996 | Smith | 395/683 |
| 5,634,095 | A | * | 5/1997 | Wang et al. | 345/763 |
| 5,727,175 | A | * | 3/1998 | Malone et al. | 345/335 |
| 5,778,404 | A | * | 7/1998 | Capps et al. | 345/179 |
| 5,784,061 | A | | 7/1998 | Moran et al. | 345/358 |
| 5,786,814 | A | | 7/1998 | Moran et al. | 345/328 |
| 5,790,116 | A | * | 8/1998 | Malone et al. | 345/356 |
| 5,796,401 | A | * | 8/1998 | Winer | 345/433 |
| 5,818,420 | A | * | 10/1998 | Mitsumine et al. | 345/433 |
| 5,848,429 | A | * | 12/1998 | McEntee et al. | 345/763 |
| 5,861,886 | A | * | 1/1999 | Moran et al. | 345/358 |
| 5,872,924 | A | | 2/1999 | Nakayama et al. | 395/200.35 |
| 5,877,768 | A | * | 3/1999 | Jain | 345/433 |
| 5,883,624 | A | | 3/1999 | Teramura et al. | 345/339 |
| 5,889,523 | A | | 3/1999 | Wilcox et al. | 345/357 |
| 5,890,131 | A | | 3/1999 | Ebert et al. | 705/7 |
| 5,903,905 | A | * | 5/1999 | Andersen et al. | 707/526 |
| 5,966,126 | A | * | 10/1999 | Szabo | 345/348 |
| 6,014,139 | A | * | 1/2000 | Watson et al. | 345/339 |
| 6,125,374 | A | * | 9/2000 | Terry et al. | 707/502 |
| 6,154,771 | A | * | 11/2000 | Rangan et al. | 345/660 |
| 6,421,068 | B1 | * | 7/2002 | Ingrassia et al. | 345/762 |
| 6,433,776 | B1 | * | 8/2002 | Todd | 345/762 |

OTHER PUBLICATIONS

Anonymous, “Intergration of GroupWare with Project Management via Facilitated Work Sessions”, IBM Technical Disclosure Bulletin, vol. 39, No. 3, Mar. 1, 1996, pp. 171–174.

Aytes et al., “Supporting Distributed GDSS”, SIGOIS Bulletin, vol. 15, No. 2, Dec. 1994, pp. 18–20.

Moran et al., “Implicit Structures for Pen–Based Systems Within a Freeform Interaction Paradigm”, Human Factors in Computing Systems, CHI ’95 Conference Proceedings, Denver, 5/7–Nov./1995, pps. 487–494.

Moran et al., “Pen–Based Interaction Techniques for Organizing Material on an Electronic Whiteboard”, Proceedings of the UIST ’97 Conference on User Interface Software and Technology, New York: ACM, 1997.

Pedersen et al., “TIVOLI: an Electronic Whiteboard for informal Workgroup Meetings”, Proceedings of the INTERCHI ’93 Conference on Human Factors in Computer Systems, pps. 391–398, Apr. 1993.

* cited by examiner

| A | B | ON-HOLD |
|---|---|---|
| PROJECT 1 [A1] | PROJECT 4 [B1] | PROJECT 6 [OH1] |
| PROJECT 2 [A2] ← 1001 | PROJECT 5 [B2] | PROJECT 7 [OH2] |
| PROJECT 3 [A3] | | PROJECT 8 [OH3] |

| A | B | ON-HOLD |
|---|---|---|
| PROJECT 1 [A1] | PROJECT 4 [B1] | PROJECT 6 [OH1] |
| PROJECT 3 [A2] ← 1002 | PROJECT 5 [B2] | PROJECT 7 [OH2] |
| | PROJECT 2 [B3] ← 1001 | PROJECT 8 [OH3] |

(figure content)

- 1301: CSA | 74 | 40 | 34
- 1302: Liveboard3 | 21
- 1302: 2 LB SVGA | 10
- ZombieBoa | 5
- ATM video | 4
- 2 Laptops | 7
- 6 PDAs | 9
- Sun Mem | 2
- Sparc 2-10 | 16

- 1303: DID | 60 | 40 | 20
- Loaded PC | 7
- Sun Monit | 3
- SS2-10 up | 10

- GIR | 40 | 40 | 0
- Pentium P | 9
- Memory U | 3
- Home PC | 6

- Lab | 174
- 120 | 54

- 1305: Category
- Budget

GROUP SUMMARY
| name | *sum | budget | *variance | up on name -> change name
up on budget -> +5K
down on budget -> -5K

1304

|  |  | 1501 | | 1502 | | | | | 1503 |
|---|---|---|---|---|---|---|---|---|---|
| Budget | | Category | C1 | C2 | C3 | C4 | C5 | Clear | Color |

| CSA | 52 | 40 | 12 |
|---|---|---|---|
| Liveboard | | | 21 |
| 2 LB SVG | | | 10 |
| ZombieBoa | | | 5 |
| 2 Laptops | | | 7 |
| 6 PDAs | | | 9 |

| DID | 45 | 40 | 5 |
|---|---|---|---|
| PC (G Govi | | | 10 |
| 2 PCs (kh, | | | 15 |
| Loaded PC | | | 7 |
| Sun Monit | | | 3 |
| SS2-10 up | | | 10 |

| GIR | 40 | 40 | 0 |
|---|---|---|---|
| PC + 2G dr | | | 10 |
| ISDN (Bier | | | 2 |
| Sparc 20 | | | 10 |
| Pentium P | | | 9 |
| Memory U | | | 3 |
| Home PC | | | 6 |

| Lab | 137 |
|---|---|
| 120 | 17 |

| Sparc 2-10 | 16 |
|---|---|
| ATM video | 4 |
| Sun Mem | 2 |

| PC printer | 15 |
|---|---|

Project Proposal  [Vote]

|   | 625% total | 200% budget | 0% selected |   |
|---|---|---|---|---|
| 1 | 25% | CSA | Moran, | Palen, L | Empirical Studies of Salvaging |
| 2 | 25% | CSA | Minnem | Ju, Sha | Analysis of Meeting and Presentatio |
| 3 | 100% | GIR | Fishkin, | Olowe, I | Fractal Painter Project |

PROJECT3 — ISTL Cost: 100%
Area:GIR | Sponsor:Fishkin, Stone | Intern:Olowe, Ife
Title:Fractal Painter Project The goal of this project is to explore PAL's ability to quickly and powerfully create artistic renderings by means of a concrete file transformation: taking renderings specified in an existing file format (PostScript and Tivoli are the two main candidates), and mapping these into renderings specified in the new PAL file format, adding the more powerful PAL-specific information. We hope that by exploding this severely underconstrained mapping, we will explore a space of powerful document enhancement tools.

Funding:

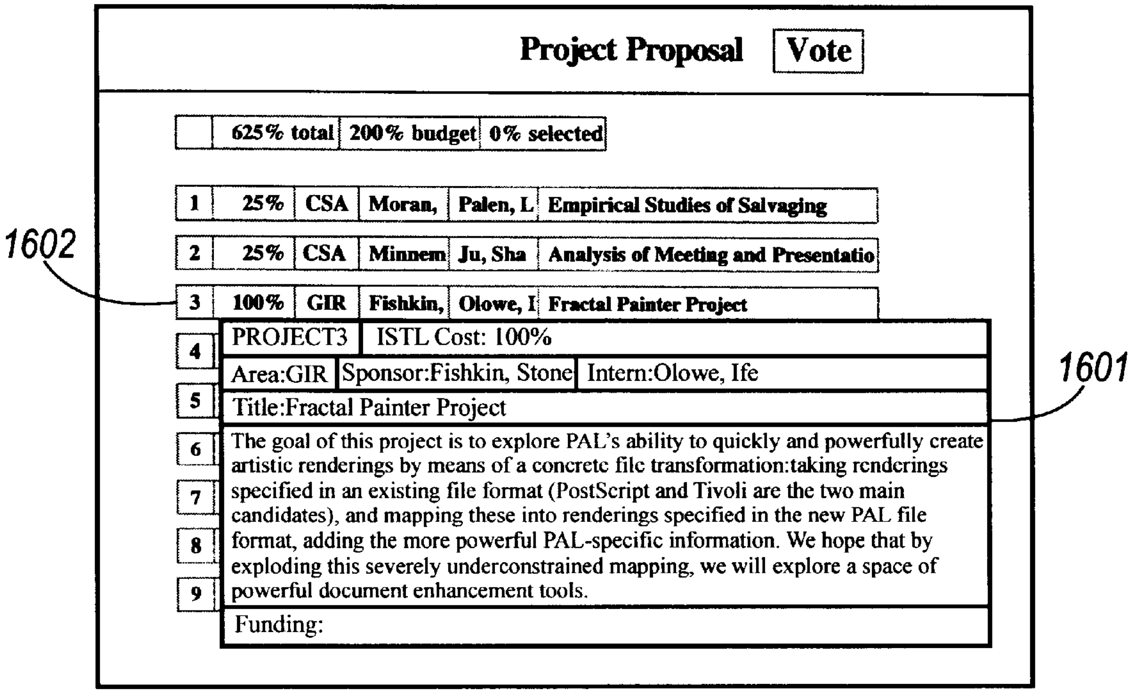

*FIG. 16*

| | | | | | |
|---|---|---|---|---|---|
| | | | | Project Proposal | Vote |
| | 625% total | 200% budget | 125% selected | | |
| 1 | 25% | CSA | Moran, | Palen, L | Empirical Studies of Salvaging |
| 2 | 25% | CSA | Minnem | Ju, Sha | Analysis of Meeting and Presentatio |
| 3 | 100% | GIR | Fishkin, | Olowe, I | Fractal Painter Project |
| 4 | 25% | CSA | Kimber, | Rubens | Software Video Media Server |
| 5 | 50% | UIR | Pirolli, | Pitkow, | Visualization of WWW Document |
| 6 | 100% | QCA | Brotsky | TBD | Document Conversion System (Syst |
| 7 | 100% | GIR | Bier | Crespo, | User Interface for documents.com |
| 8 | 100% | QCA | Schuetz | Luo, Qi | Information Filtering for the World |
| 9 | 100% | GIR | Bier, Ch | Crespo | Rapid Prototyping using WebWrite |

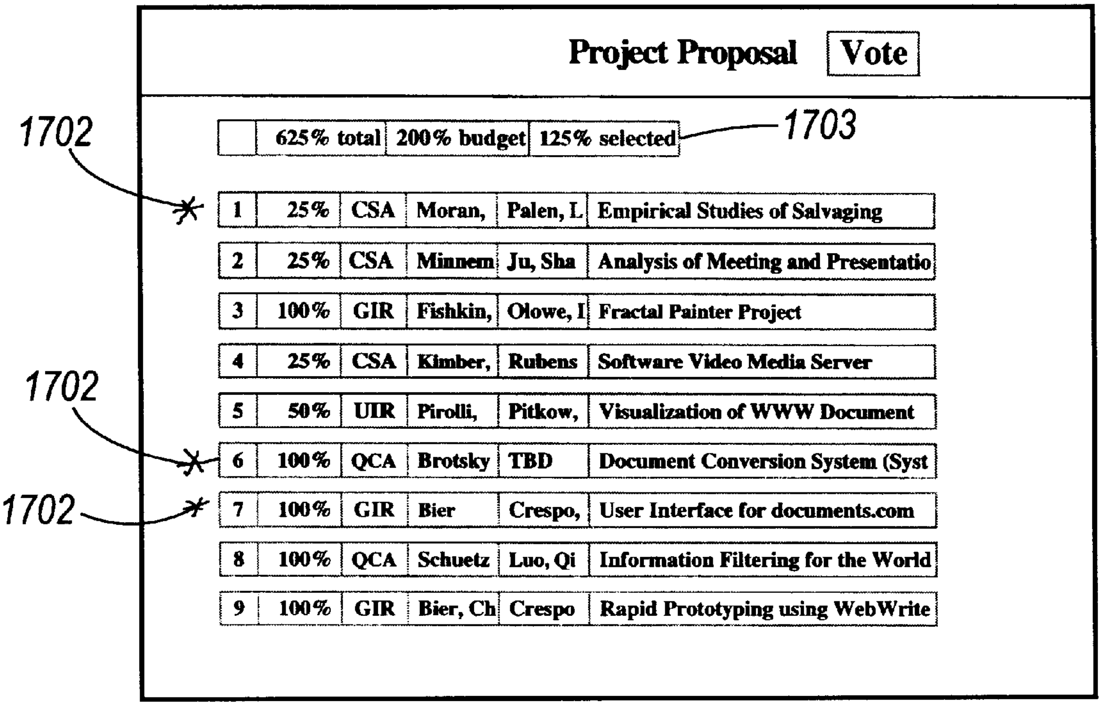

FIG. 17

| | | | | Project Proposal | Vote |
|---|---|---|---|---|---|
| | | 625% total | 200% budget | 125% selected | |

| | | | | | 1801 |
|---|---|---|---|---|---|
| ✱ | 7 | 100% | GIR | Bier | Crespo, | User Interface for documents.com |
| | 9 | 100% | GIR | Bier, Ch | Crespo | Rapid Prototyping using WebWrite |
| ✱ | 6 | 100% | QCA | Brotsky | TBD | Document Conversion System (Syst |
| | 3 | 100% | GIR | Fishkin, | Olowe, I | Fractal Painter Project |
| | 4 | 25% | CSA | Kimber, | Rubens | Software Video Media Server |
| | 2 | 25% | CSA | Minnem | Ju, Sha | Analysis of Meeting and Presentatio |
| ✱ | 1 | 25% | CSA | Moran, | Palen, L | Empirical Studies of Salvaging |
| | 5 | 50% | UIR | Pirolli, | Pitkow, | Visualization of WWW Document |
| | 8 | 100% | QCA | Schuetz | Luo, Qi | Information Filtering for the World |

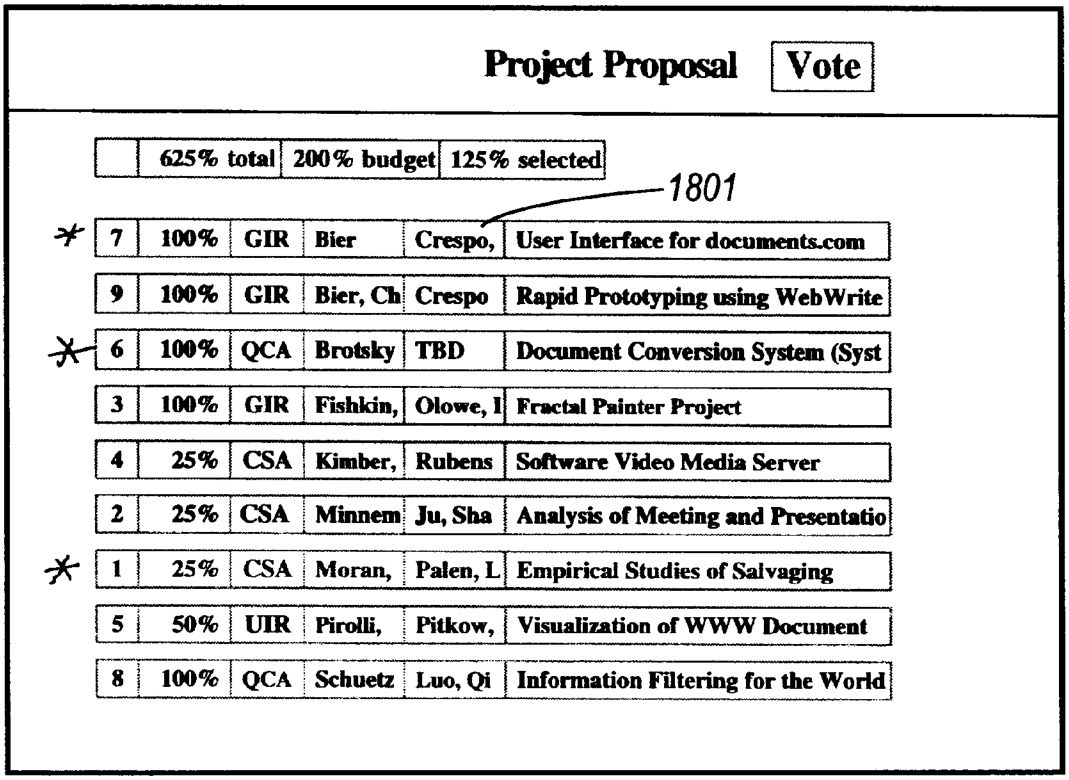

FIG. 18

| | | | | | | |
|---|---|---|---|---|---|---|
| | | Project Proposal | Vote —1901 | | | |
| | 625% total | 200% budget | 125% selected | | | |
| ✱ 1 | 25% | CSA | Moran, | Palen, L | Empirical Studies of Salvaging | 6 |
| 2 | 25% | CSA | Minnem | Ju, Sha | Analysis of Meeting and Presentatio | 4 |
| 9 | 100% | GIR | Bier, Ch | Crespo | Rapid Prototyping using WebWrite | 3 |
| ✱ 7 | 100% | GIR | Bier | Crespo, | User Interface for documents.com | 3 |
| 8 | 100% | QCA | Schuetz | Luo, Qi | Information Filtering for the World | 2 |
| 3 | 100% | GIR | Fishkin, | Olowe, I | Fractal Painter Project | 2 |
| ✱ 6 | 100% | QCA | Brotsky | TBD | Document Conversion System (Syst | 1 |
| 4 | 25% | CSA | Kimber, | Rubens | Software Video Media Server | 1 |
| 5 | 50% | UIR | Pirolli, | Pitkow, | Visualization of WWW Document | 1 |

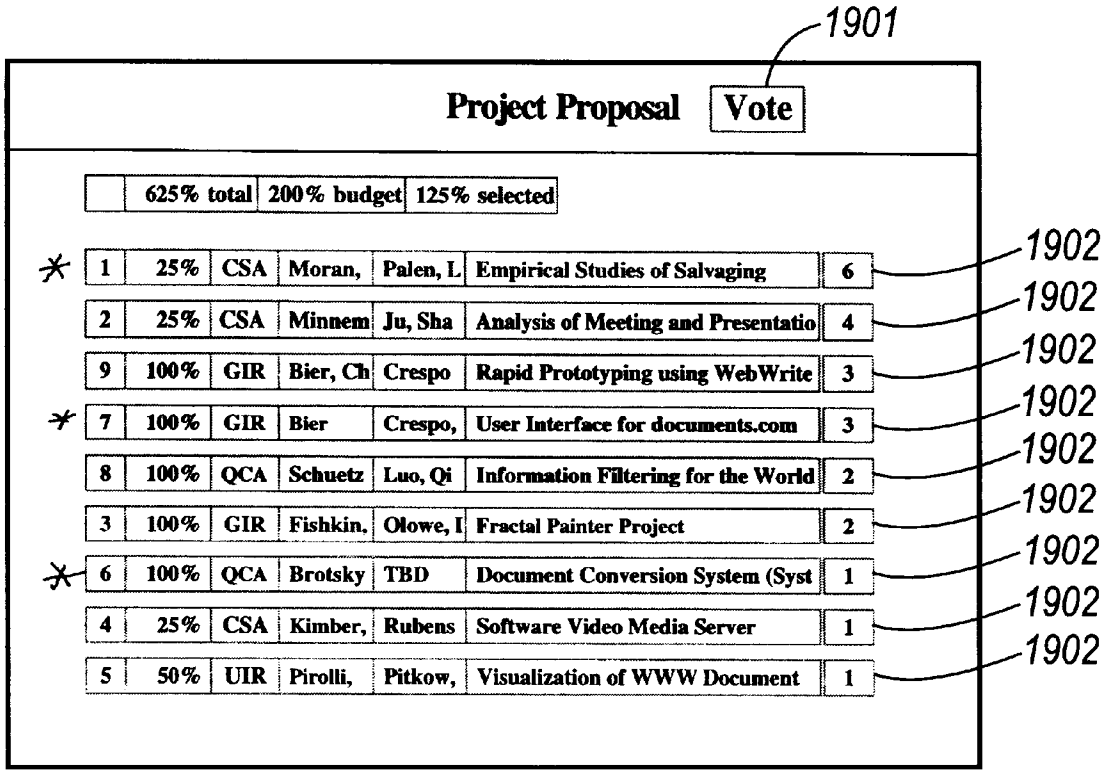

FIG. 19

| Agenda | 🕐 15:00 |

| * | 1. Report from the staff meeting | Tom | —2001 |
| * | 2. Current status of sub-projects | All | —2002 |
| * | 3. Planning for group offsite meeting | Polle | —2003 |
| * | 4. Summer intern candidates | Steve | —2004 |
| * | 5. Coordination for the LiveWorks dem | Don | —2005 |
| * | 6. *Interview schedule for Frank* | | —2006 |

END

Agenda ⏱15:39

| | 1. Report from the staff meeting | Tom | —2101 |
| | 2. Summer intern candidates | Steve | —2104 |
| ! | 3. Current status of sub-projects | All | —2102 |
| * | 4. Planning for group offsite meeting | Polle | —2103 |
| * | 5. Coordination for the LiveWorks dem | Don | —2105 |
| * | 6. Interview schedule for Frank | | —2106 |

END

MEETING

2302 — ATTENDEES:   2301

| present | Chuck Hebel |
| present | Jim Boyce |
| absent | Anne Chiang |
| present | Ron Fulks |
| present | Alan Lewis |
| excused | Bob Street |
| departed | Bill Turner |
| present | Richard Weisfield | Phone No. | E - Mail | Mail Stop | — 2304
| present | JSB |

—2303

DOMAIN OBJECTS FOR USE IN A FREEFORM GRAPHICS SYSTEM

CROSS REFERENCE TO RELATED APPLICATIONS

This application is related to the following concurrently filed and commonly assigned patent applications:

"DOMAIN OBJECTS HAVING COMPUTED ATTRIBUTE VALUES FOR USE IN A FREEFORM GRAPHICS SYSTEM", Ser. No. 09/005,983; and "A FREEFORM GRAPHICS SYSTEM HAVING MEETING OBJECTS FOR SUPPORTING MEETING OBJECTIVES", Ser. No. 09/005,974.

FIELD OF THE INVENTION

The present invention is related to the field of interfaces for freeform computer controlled display systems, and in particular to providing application specific objects representing data in a freeform computer based system.

BACKGROUND OF THE INVENTION

Computer based systems such as pen based systems and "electronic whiteboards", provide graphical user interfaces based on utilization of an input device such as a pen, stylus or a cursor control device. Such systems are often a combination of hardware and software and typically enable freeform input and are termed freeform graphics systems. In such systems the "display" shows a workspace that acts as both a means for showing data and as an input medium. Graphic objects may be "drawn" on the display via pen strokes created using the input device. The graphic objects may represent words, figures or anything that can be displayed. Various operations can then be performed on the graphic objects using an input technique known as gestures. Gestures are themselves merely pen strokes that are interpreted as instructions. Sometimes, such systems will have a draw mode of operation and a gesture mode of operation to distinguish when a pen stroke creates a persistent graphic object or when the pen stroke is treated as a gesture.

To facilitate user interactions, the LiveBoard system provides the notion of structures. Various types of structures utilized by the LiveBoard system are described in EPA 0 667 567 A2, entitled "Apparatus and Method For Supporting the Implicit Structure of Freeform Lists, Outlines, Text, Tables, and Diagrams In A Gesture-Based Input System and Editing System", which is assigned to the same assignee of the present application. Conceptually a structure is a collection of graphic objects that have a particular relationship, e.g. a list of items written on the LiveBoard. When a structure operation occurs the relationship amongst the items is retained. For example, when an item is inserted into the middle of a list, the items below the insertion point are moved down in order to make room for the inserted item.

When using such freeform graphics systems as the LiveBoard, it has been determined that often the information being worked on is structured data. Structured data is a representation of information wherein the individual data components form a defined relationship. For example, the data found in individual cells of a spreadsheet application comprise the spreadsheet information. As the "value" contained in one cell may depend on the values in other cells, a structure relationship is formed.

As known freeform editing programs do not look at the underlying content of graphic objects, they do not facilitate operation wherein the content of such graphic objects have such relationships. On the other hand, a structured application is usually too rigid, constraining the use to the confines of predefined structures.

It would be desirable to flexibly combine the best of both kinds of applications—some facilities to help with the structured data, but the freedom to annotate or make marks of any kinds when needed.

One approach to doing this would be to embed Object Link Embedding (OLE) objects into a freeform editing program. OLE is functionality provided in the Windows™ Operating System, which enables application objects to be linked or embedded into other applications. This approach is found in a product called the Meeting Board, which was available from LiveWorks, an affiliated company of the Xerox Corporation. But this approach is awkward, since each object evokes its own application, leading to a multiplicity of different user interfaces on the display. Also, the elements of the OLE objects are not integrated with the other objects of the freeform editing program; e.g., the individual cells of an embedded spreadsheet are not accessible to the freeform editing program.

Other related technology includes the ActiveX Data Objects and related programs available from the Microsoft Corporation.

SUMMARY

Domain objects for use in a freeform graphics system are disclosed. Domain objects are context specific representations of structured data that is used in a freeform graphics system. Domain objects are represented in a freeform graphics system by an icon. The icon representing a domain object may be manipulated and interpreted like any other graphic object in the freeform graphics system. Moreover, the information contained within the icon (as well as the corresponding domain object attributes) and the size and shape of the icon may change, based on predefined spatial parameters or as the result of predefined operations performed on the icon (e.g. via a gesture).

The freeform graphics system of the present invention is generally comprised of: a display for displaying graphic objects on a work surface; an input device for indicating actions on graphic objects on said work surface; a storage device for storing attribute data and domain object class definitions, said domain object class definitions defining attributes, a set of action rules and layouts; domain object generation circuitry for generating a plurality of domain objects from said attribute data and said domain object class definitions; and icon generation circuitry coupled to said domain object generation circuitry and said display, said icon generation circuitry for generating a graphic object visually representing a corresponding domain object as an icon for displaying on said display work surface using one of said layouts of said domain object class definition, said icon capable of being interpreted like any other graphic object in said freeform graphics system.

BRIEF DESCRIPTION OF THE FIGURES

FIGS. 16–18 illustrate the use of project, and project summary domain objects in a decision-making meeting application implemented on a freeform graphic system in the currently preferred embodiment of the present invention.

FIG. 19 illustrates the use of vote-creation and vote domain objects for use in voting in a meeting as may be used in various meeting applications implemented on a freeform graphic system in the currently preferred embodiment of the present invention.

DETAILED DESCRIPTION OF THE PREFERRED EMBODIMENT

Figure 1:
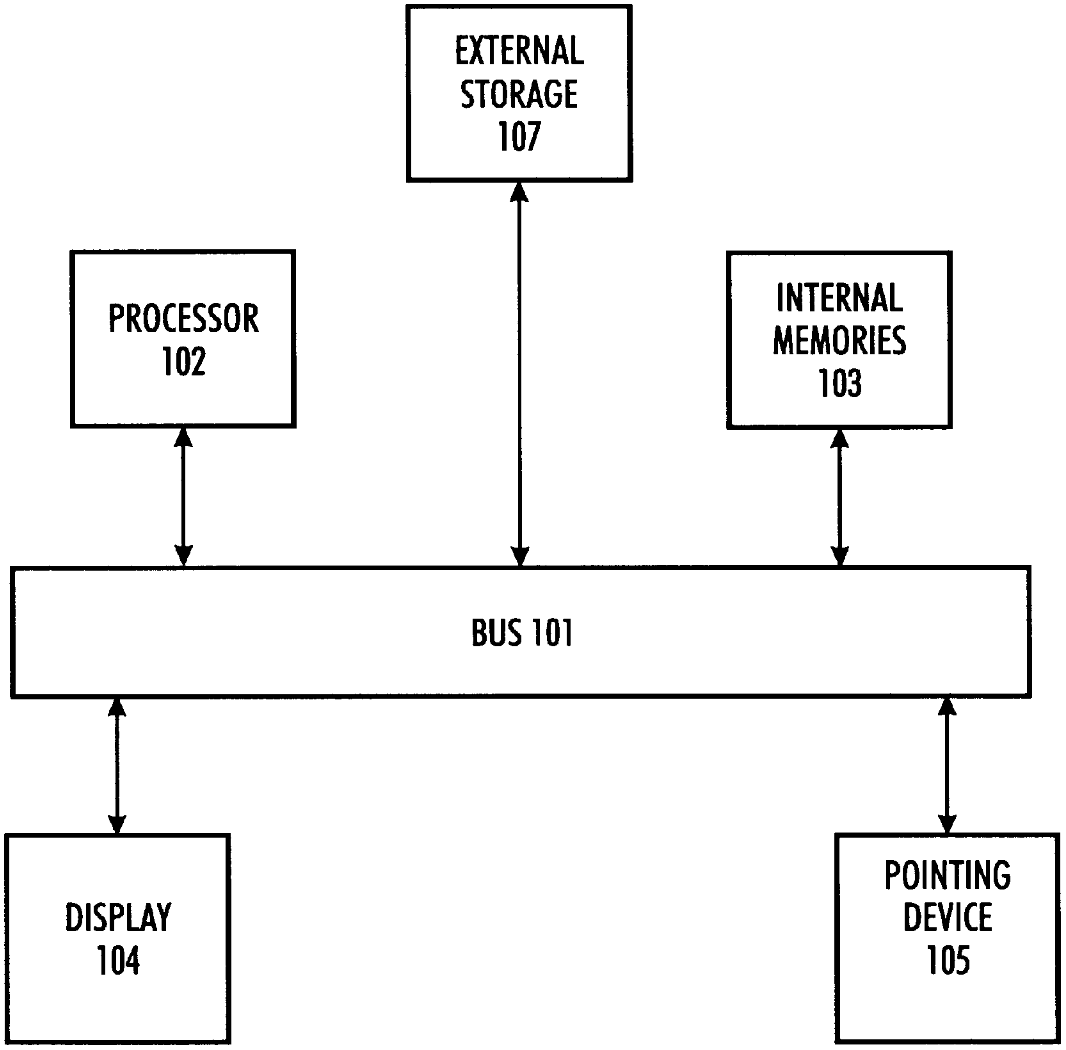
FIG. 1 is a block diagram of a graphics based computer system as may be utilized in the currently preferred embodiment of the present invention.

Domain objects for use in a freeform graphics system is disclosed. A freeform graphics system generally has the characteristic that input objects may be placed spatially anywhere on a workspace associated with the system. Domain objects are used to represent collections of related information in an application. In one sense domain objects are structured in that they represent structured information. In another sense domain objects are freeform in that they can be spatially positioned, manipulated or interpreted like any other graphic object in a freeform graphics system.

The following terms are used in this description and have their indicated meanings:

Graphic Object: Any displayed object of the workspace of the freeform graphics system.

Domain Object Class: A set of specifications for structuring a set of data in a particular domain of work as a set of objects. A domain object class defines a set of attributes, actions and layouts.

Domain Object: A set of data in a particular domain of work bundled as an object. Each domain object is an instance of a domain object class with its own particular set of data. The term is also used to generally refer to the overall capabilities provided by the present invention.

Icon: A visual representation of a domain object as specified by the layout definition of its domain object class.

Application: A particular type or domain of work for which a particular set of domain object classes is defined.

User Action: A user input associated with a graphic object, such as performing a gesture on the graphic object or spatially moving a graphic object which is interpreted by the system as an event and which causes a corresponding operation to be performed.

System Event: An external event detected by the system not resulting from a user action, such as the passage of a particular period of time, which causes a corresponding operation to be performed.

Spatial Structure: A predetermined spatial relationship among a set of graphic objects. Operations performed on graphic objects in the structure will preserve the predetermined spatial relationship. Spatial structures as may be recognized and utilized in the present invention are described in co-pending patent application Ser. No. 08/176,150 entitled "Apparatus and Method For Supporting The Implicit Structure Of Freeform Lists, Outlines, Text, Tables, and Diagrams In a Gesture-Based Input System And Editing System", which is assigned to the same assignee as the present application.

Domain Structure: The relationship between the attribute data values as defined in a domain object class or set of classes.

Computed Value: An attribute data value in a domain object class that is obtained through some computation, rather than being specified explicitly.

Domain objects may be used for many different types of applications. In a budget tracking application a domain object class may be defined to represent individual budget items. For an application used to facilitate meetings, a domain object class may be defined to represent the agenda items. Other examples include rooms and people in space planning, tasks and resources in project management, requirements and technical options in design. Domain objects represent desired information and are visually displayed as icons on the workspace of the freeform graphics system. The icons can be manipulated on a display screen like any other graphic object on a freeform graphics system.

The currently preferred embodiment of the present invention is implemented on a system for supporting collaborative activities, such as an electronic whiteboard. The present invention is also well suited for other types of systems such as pen-based systems, laptops, palmtops, electronic desktops and the like. Moreover, any freeform editing program may incorporate the present invention. A freeform editing program refers to a graphics system, usually pen-based, that allows the user to freely create and edit materials on the display without spatial constraints. Examples include scribbling, sketching, and painting applications, based on metaphors such as whiteboards, sketchpads, or notebooks.

Overview of the Freeform Graphics Based Computer System of the Currently Preferred Embodiment The freeform graphics based computer based system as may be utilized in the present invention is illustrated with reference to FIG. 1. Referring to FIG. 1, the computer-based system is comprised of a plurality of components coupled via a bus 101. The bus 101 illustrated here is simplified in order not to obscure the present invention. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access or Read Only Memories). When in operation, program instructions for carrying out the various functional components of the present invention are stored in internal memory 103. The processor 102 and internal memory 103 may be discrete components or a single integrated device. The processor 102 and internal memory 103 comprise circuitry for performing the various processing functions described herein. Also coupled to the bus 101 is external storage 107. The external storage 107 is typically a high capacity storage medium such as magnetic or optical disk storage.

Also coupled to the bus 101 is a display 104 and pointing device 105. In the currently preferred embodiment, the pointing device 105 is a pen driven infrared sensitive panel, which is integrated with the display 104. Such screen displays are well known in the art and are utilized in such systems as a Pen based system and for electronic whiteboard systems. However, the pointing device 105 and display 104 need not be integrated so that the pointing device 105 may also be a stylus, mouse, track-ball or other cursor control device.

The currently preferred embodiment of the present invention is implemented on a LiveBoard System operating under the control of a whiteboard emulation control program known as and referred to herein as Tivoli. The LiveBoard System is a large screen computer based system developed by the Xerox Corporation. The Tivoli application is described in greater detail in the following references:

Pedersen, E., K. McCall, T. Moran, and F. Halasz, "Tivoli: An Electronic Whiteboard for Informal Workgroup Meetings", *Proceedings of the INTERCHI '93 Conference on Human Factors in Computing Systems,* pp. 391–389, April 1993.

Moran, T. P.,Chiu, P., van Melle, W., Kurtenbach, G. (1995), "Implicit Structures for Pen-Based Systems Within A Freeform Interaction Paradigm", *Proceedings of the CHI '95 Conference on Human Factors In Computer Systems, New York:* ACM.

Moran, T. P., Chiu, P., van Melle, W. (1997), "Pen-based Interaction Techniques For Organizing Material On An Electronic Whiteboard", *Proceedings of the UIST '97 Conference on User Interface Software and Technology, New York:* ACM.

The various features of Tivoli as they apply to the currently preferred embodiment of the present invention are described below.

General Overview of the Present Invention

The currently preferred embodiment of the present invention is implemented in a computer based system having the following elements:

(1) the concept of a domain object, (2) a database capable of storing data representing domain objects, (3) a freeform editing program that can edit the domain objects, (4) programs for transferring domain objects between the editing program and the database, and (5) a scripting language for defining the structure, appearance, behavior, and user interface of the domain objects in the application.

Figure 2:
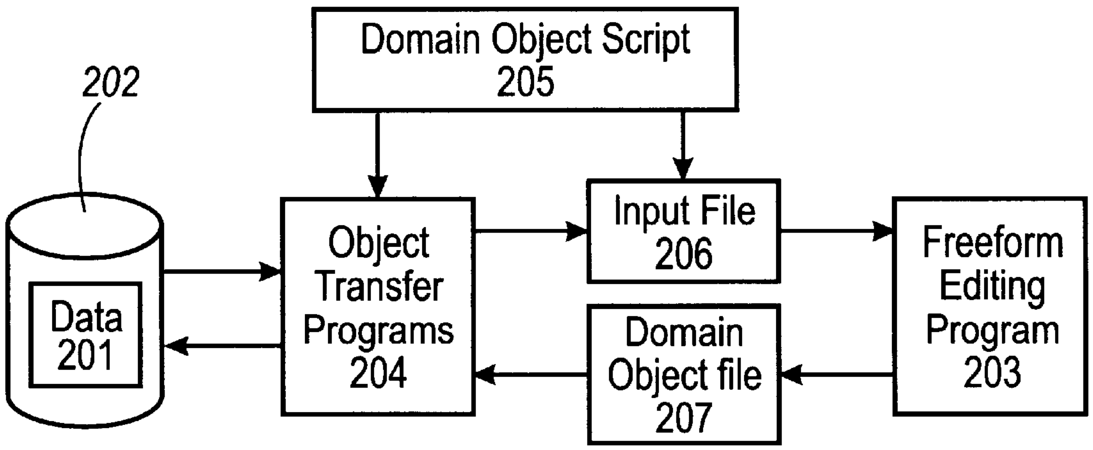
FIG. 2 is a block diagram illustrating the basic elements of the present invention.

FIG. 2 is a block diagram illustrating the relationship amongst the elements. Referring to FIG. 2, data 201 represents Domain object data stored in a database 202. The database 202 can be any repository for persistently storing domain objects, such as files, spreadsheets, or relational databases. It should be noted that the data 201 may be preexisting data, or data that was created for the application in which the domain objects are used. To operate in the system, the database must be able to export/import data to/from the database as objects. The database need not itself be object-oriented, as long as the Object Transfer programs 204 can use protocols to the database 202 to interpret the data in the database as objects. In the currently preferred embodiment, the commercially available Lotus Notes™ database program, available from the IBM Corporation of Armonk, N.Y. is one of the databases used.

A freeform editing program 203 is used to manipulate and perform operations on the icon representation of the domain object. As noted above, in the currently preferred embodiment, the freeform editing program implemented is Tivoli running on the LiveBoard. Tivoli presents 2D workspaces (pages) containing graphic objects, such as strokes, characters, clocks, boundaries, etc. These graphic objects can be freely created, edited, and arranged on the surface. The system is pen-based, which makes it particularly easy and natural for the user. In addition to freeform editing, Tivoli allows "implicit structuring" (e.g. on-demand list manipulation) for support of spatial structures. Tivoli also allows the materials on the surface to be organized by creating boundaries defining regions and links between objects. Tivoli interprets and operates on the icons representing domain objects just like other graphic objects in Tivoli. As will be described, other graphic objects in Tivoli, such as handwritten strokes, can be used as attribute values within a domain object.

Object transfer programs 204 facilitate the transfer of data 201 between the freeform editing program 203 and the database 202. The object transfer program 204 accesses a domain object script 205 that contains the domain object class information. In the currently preferred embodiment, an object transfer program 204 has been written which uses the Lotus Notes Application Programming Interface (API) to extract data and create an Input file 206 in Tivoli Markup Language (TML) format, which Tivoli can load. Examples of an Input File 206 in TML are provided below. TML allows domain objects to be described and spatially laid out on Tivoli pages. Once the Input file 206 is loaded into Tivoli, the domain objects can be changed by user actions or system events. Tivoli can write these altered domain object descriptions into a domain object file 207, from which another object transfer program 204 can put the changes back into the Lotus Notes database. The object transfer programs 204 are written in a suitable programming language that would be known by one of ordinary skill in the art such as C or Python. Further information on the Python Language can be found on the World Wide Web at the URL www.python.org. A scripting language is used for defining domain object scripts 205 which define the domain object class specifying the structure, appearance, behavior, and user interface of the domain objects used in an application. In the currently preferred embodiment, Tivoli has a domain object scripting language, embedded in TML, for defining the structure, appearance, behavior, and user interface of the domain objects in Tivoli. The language does this by enabling the definition of domain object classes.

It should be noted that the above description of the currently preferred embodiment facilitates the use of existing commercially available database products with an existing freeform graphics editing system. It would be apparent to one of skill in the art to integrate the functionality of various of the components into a single stand-alone system. Such an integrated implementation would not cause departure from the spirit and scope of the present invention.

Domain Object Class

Figure 3:
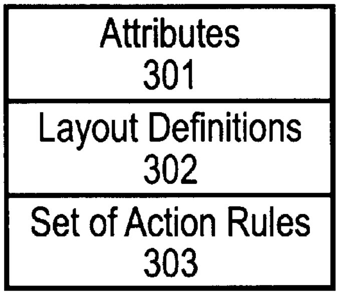
FIG. 3 is a block diagram illustrating the elements of a domain object class of the currently preferred embodiment of the present invention.

FIG. 3 is a block diagram illustrating the elements of a domain object class. Referring to FIG. 3, a domain object class is defined by specifying the following components: attributes 301, layout definitions 302, and a set of action rules 303. The attributes 301 define the data items, as well as how the value for the data items is derived, that are used by objects in the class. The attributes are described in greater detail below with reference to FIG. 4. The layout definitions 302 are used to describe the various appearances of the domain objects as graphic objects ("icons"). The types of layouts utilized in the currently preferred embodiment are described in greater detail below in the description of domain object icons. The set of action rules 303 are used to define what operation to perform when certain user actions or system events occur. This set of action rules is preferably defined in an Action Table that is used to map system and user events, such as user editing actions, to the operations to be performed. The kinds of operations that may be performed are described in greater detail below.

Figure 4:
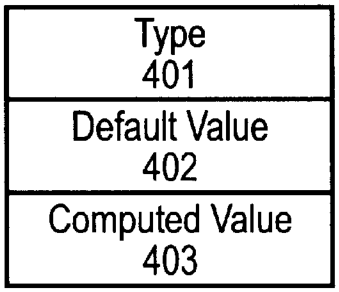
FIG. 4 is a block diagram illustrating in further detail attribute elements of a domain object class of the currently preferred embodiment of the present invention.

Referring to FIG. 4, an attribute element of a domain object class comprises a type 401 and optionally a means for determining the value of the attribute for any object of the class. Some attributes of an object are given their values explicitly, either from the information about the object in the database or from direct user input. However, a value can also be implicit, derived from a computation given in its class. There are two types of implicit values, default and computed. A default value 402 is one that any object of this class is given on creation (if it didn't already have an explicit value), but it can be modified by action of the user. A computed value 403 is one that is determined by a formula or program, typically based on the values of other attributes of the same object or of other objects with which it is in some logical or spatial relationship.

In the currently preferred embodiment, the designer of a domain object application uses the scripting language to create a set of classes that, in effect, customizes Tivoli for a particular kind of meeting or activity. Once the classes are specified, TML allows specific domain objects (instances of the classes) to be defined and laid out on Tivoli pages.

Integrating Domain Objects into Freeform Editing programs

In the currently preferred embodiment, the domain objects and their behaviors are intimately integrated with the existing Tivoli mechanisms, both the freeform and the implicit structure mechanisms. There are two senses in which this is so: (1) Scribbles, i.e. marks made with an input device such as handwritten words or drawings, can be made anywhere in Tivoli, and these can be incorporated into domain objects as values of domain object attributes. (2) Domain object icons are Tivoli graphic objects and can be edited like any other objects. Further, Tivoli's implicit structure mechanisms move icons around just like they move strokes around to maintain list structures.

The creation of an application using domain objects depends in part on the facilities provided by the underlying freeform graphical editing program. In the currently preferred embodiment, Tivoli is the Freeform Editing program and the combination of Tivoli with a LiveBoard comprise a Freeform Graphics System. In any event, as described above, the Tivoli system is able to recognize spatial and structural relationships between graphic objects, as well as recognize user input in the form of gestures. Such capabilities provide a framework for creating applications that can fully exploit the capabilities of domain objects.

Figure 5:
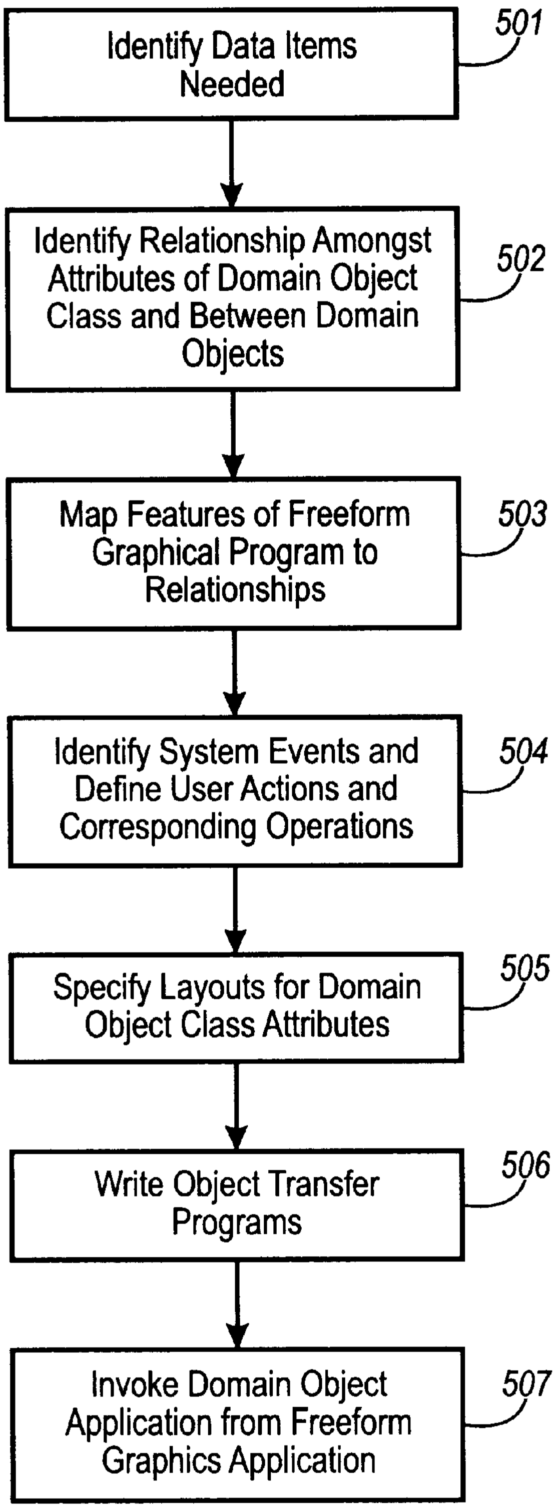
FIG. 5 is a flowchart illustrating the basic steps for creating an application utilizing domain objects in the currently preferred embodiment of the present invention.

FIG. 5 is a flowchart describing the basic steps for creating an application utilizing domain objects. First, the application designer must identify the data items needed, step 501, that is, the domain objects and their attributes. These data items become the domain objects and their attributes which are specified by the domain object classes. The designer must also identify the desired relationships amongst the attributes of the domain object class as well as the relationships between domain objects, step 502. The designer would then map the features of the particular freeform graphic program to the identified relationships between domain objects, step 503. For example, Tivoli recognizes a number of predefined pen strokes as gestures for which some operation would be performed. Another example would stem from Tivoli's ability to recognize list structures, and it may be desirable to associate a domain object attribute to the list structure. In any event, from this mapping, the designer would then identify system events and user actions and corresponding operations for the domain object class, step 504. Finally, the designer would specify the various layouts of data for when the domain objects are displayed as icons on the workspace of the system, step 505. At this point, one or more domain object classes have been defined. As described above implementation of the domain object classes is described below with respect to the meeting support examples.

Once the domain object classes are specified, object transfer programs are written to facilitate the transfer of data from the database to the freeform graphics system, step 506. As described above the object transfer programs are written in a suitable programming language that interfaces with the database and the freeform graphics system. Finally, the domain object application is invoked from the freeform editing program and pages displayed with the desired domain object icons displayed and capable of being manipulated, step 507. When the Application is invoked, the object transfer program creates domain objects for use by the freeform graphics system.

It should be noted that multiple domain object classes may be defined for a particular application.

Domain Object Icon

Figure 6:
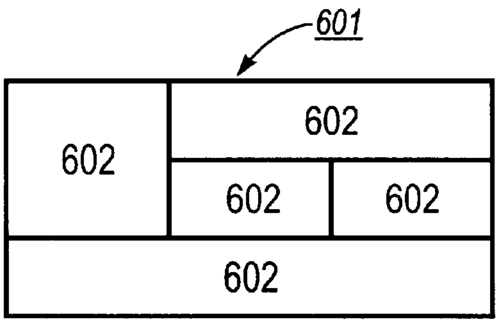
FIG. 6 is a diagram illustrating the basic layout of an icon for visually representing a domain object in the currently preferred embodiment of the present invention.

The domain objects brought into Tivoli can be treated as Tivoli graphic objects. A domain object is invisible data, but it is visually represented by one or more graphic objects referred to as icons. As briefly described above, an icon is specified by a layout expression in the domain object class definition using the domain object scripting language. The layout expression tells what attribute values of the domain object to display and in what format and order. FIG. 6 illustrates an example of a layout of an icon. Referring to FIG. 6, an icon 601 is a two-dimensional rectangular object divided up into "panes" 602 in which are displayed the different attribute values and/or descriptive text, according to the layout. The size of a pane depends on the amount of information to be displayed for a particular class attribute, and the number of panes depends on how many attribute values are to be visually displayed. An icon can be small (so that many of them can be put on a page) or large (so that a lot of information about the domain object can be exposed). A domain object may have several different icon layouts to give different views of the object. Moreover, each layout may show all or a subset of the attributes for a particular domain object class.

It should also be noted that each pane of a layout is individually identifiable. So for example, Tivoli can distinguish a user action (e.g. a gesture) performed with respect to an individual pane rather than the whole icon. The desirability of this will become apparent below in the description of the action rules.

A particular kind of icon used in the currently preferred embodiment of the present invention is an overlay. An overlay is typically used to present more detailed information of a domain object class responsive to a user action. The overlay uses the same kind of layout expression as described above, but is opaque so it can be viewed even if it is large and displayed on a crowded workspace. An overlay can also function as a menu, to allow the user to choose one of a set of values for an attribute or to cause some operation to be performed.

User Actions on Icons

Icons behave and are treated like other Tivoli graphic objects (i.e., they can be selected, erased, wiped, moved, copied, shrunk, etc.). But the user interface to domain object icons can be extended by defining special actions in response user actions on the icons. In the currently preferred embodiment such user actions are typically invoked by a user operating the pen-input device to perform a gesture. The gestures are an open-ended set, including: tap (on the icon with the pen), double-tap, hold (the pen for a short time on the icon), gesture up (from the icon) or down or left or right, gesture up-down, or left-right (back and forth gestures), gesture a pigtail (usually used for deletion), drop (something onto the icon).

System Operations can be associated with user actions such as gestures. The class definition of a domain object specifies an action table, which is a list of rules of the form:

layout, pane, action→operation.

That is, different operations can be invoked for each layout, for each pane within a layout, and for each gesture on a pane. The application designer may also specify the same operations to be invoked on all layouts or on all panes of a layout.

The operations taken responsive to a gesture are arbitrary programs written in the domain object scripting language. Some examples include: select the icon, change the appearance of the icon (its layout or color), delete the icon, change the value of an attribute, bring up an overlay icon pop up a menu (a particular kind of overlay), incorporate strokes from the page into an attribute value, drop strokes from an attribute value onto the workspace.

The actions are not confined to operate on the domain object being gestured at. The action can affect other domain objects. For example: compute changes to other domain objects, sort icons on this page, create new domain objects and/or icons, and create new display pages.

It is preferable when scripting the particular gestures on a domain object, to use gestures that suggest the operation. For example, an up gesture might increment a value, a right gesture might change an icon to be one that is larger (i.e., the icon appears to expand to the right), or an up-down gesture might evoke a sort operation on a list (i.e., objects shuffle vertically).

Computed Values of Attributes

Another feature of domain objects is that the values of particular attributes can be dynamically computed. This is similar to a spreadsheet application (e.g. Microsoft Excel available from Microsoft Inc. of Redmond, Wash.), whose cells can contain formulas to compute their values. Just like spreadsheets, Tivoli dynamically recomputes the attribute values after every user action that might affect them. The difference between Tivoli and a spreadsheet is that Tivoli is a freeform editing environment, and not a rigid matrix like a spreadsheet. Further, Tivoli uses spatial relationships (i.e. spatial structures) to reference other domain objects in making the computations, whereas spreadsheets use simple absolute or relative addressing of cells in their formulas.

Figure 7:
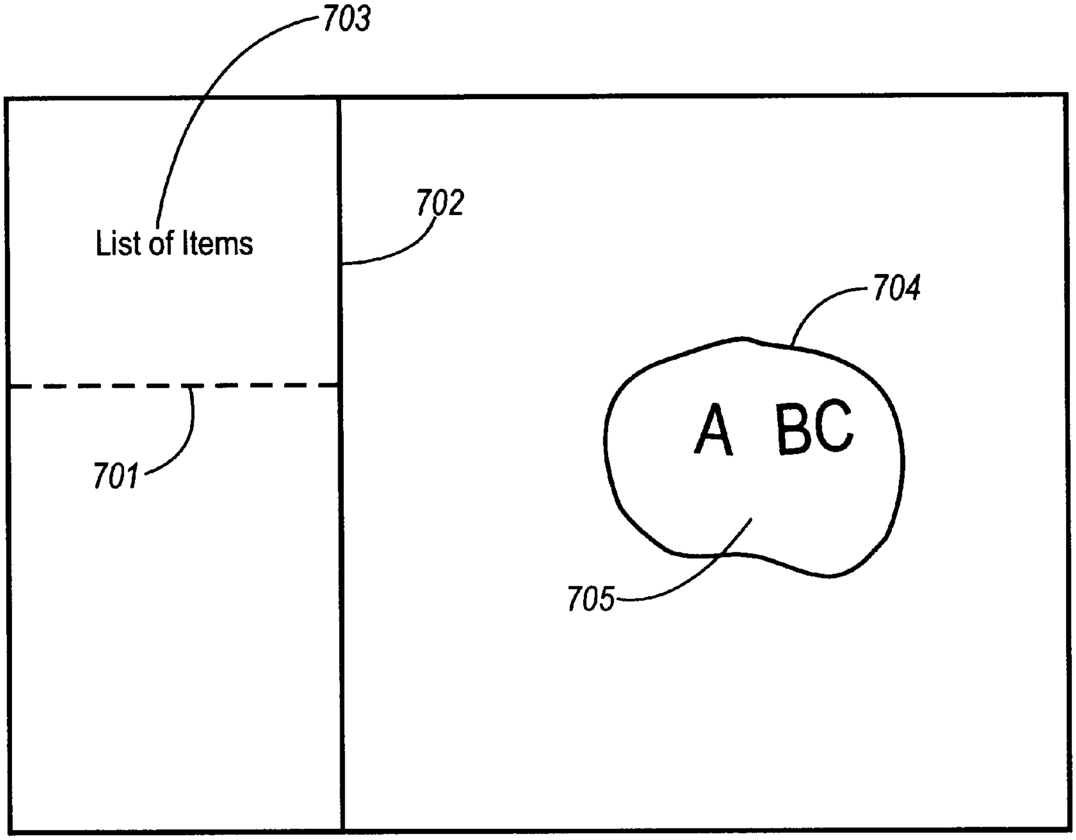
FIG. 7 illustrates region structures for organizing items in a freeform graphics system in the currently preferred embodiment of the present invention.

Tivoli provides three kinds of spatial structures for organizing materials on the display surface: regions defined by boundaries, links, and various spatial structures, such as lists, running text, and table structures. These structures may be used for computing attribute values. FIG. 7 illustrates two kinds of boundaries provided in Tivoli. Referring to FIG. 7, a workspace having structured boundaries is illustrated. Structured boundaries are defined by straight horizontal or vertical lines that tessellate a workspace to define rectangular regions. In FIG. 7, boundaries 701 and 702 intersect to form region 703. Curve 704 is an example of a freeform enclosure. Freeform curves define arbitrarily shaped regions. Here, curve 704 defines the enclosed region 705. Regions defined by boundaries as implemented in Tivoli are described in greater detail in co-pending application Ser. No. 08/670,915.

Figure 8:
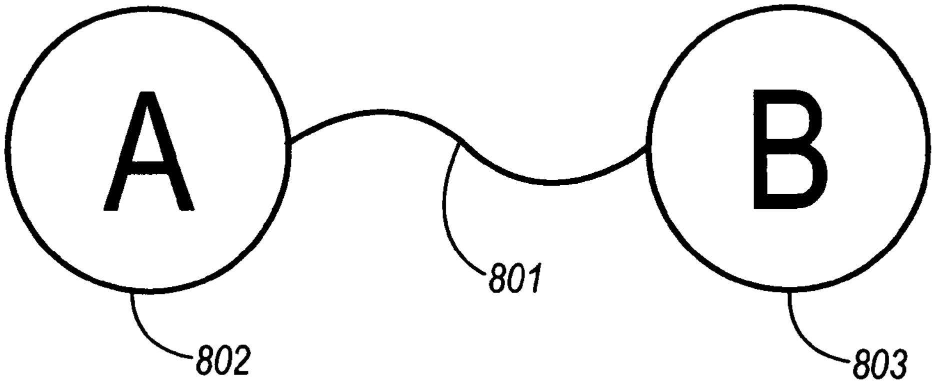
FIG. 8 illustrates a link structure for organizing items in a freeform graphics system in the currently preferred embodiment of the present invention.

Tivoli recognizes any stroke that connects two enclosures or icons as a link between them. Such a link is illustrated in FIG. 8, wherein link 801 connects enclosures 802 and 803. A link is used to indicate a relationship between the two linked entities. Links as implemented in Tivoli are described in greater detail in co-pending application Ser. No. 08/698,741.

Figure 9:
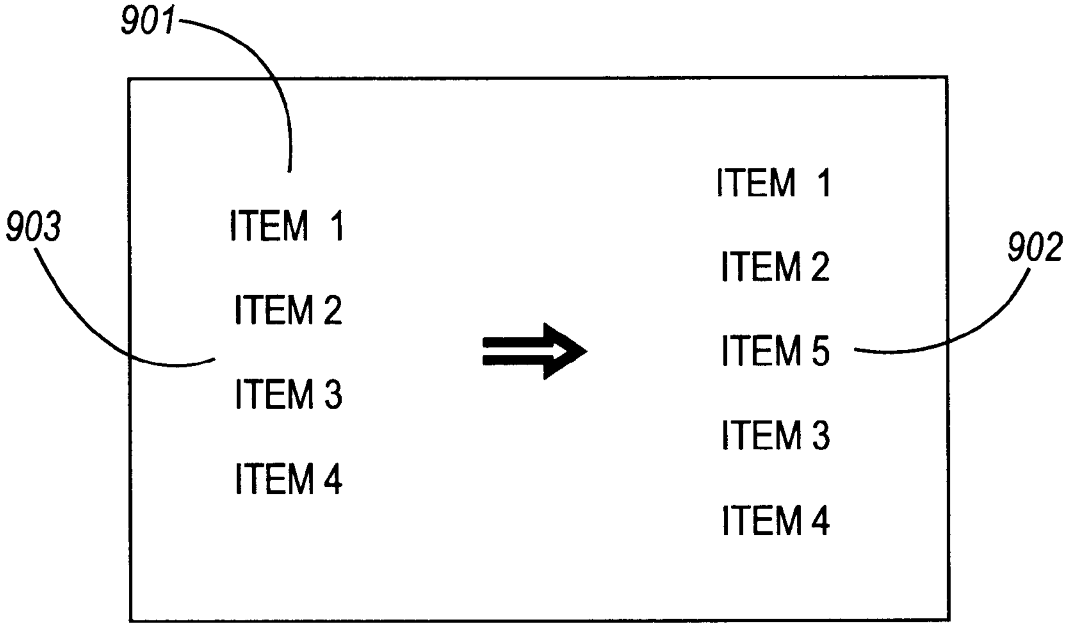
FIG. 9 illustrates list structures for organizing items in a freeform graphics system in the currently preferred embodiment of the present invention.

Tivoli further provides facilities for interpreting the arrangements of graphic objects as items of a list and other structures and for maintaining and manipulating these structures. For example, Tivoli can compute the (numeric) list-wise position of any graphic object. Maintaining the list orientation of items is described in greater detail in the aforementioned co-pending patent application Ser. No. 08/176,150. List manipulation is illustrated in FIG. 9. Referring to FIG. 9, a list 901 is illustrated having a plurality of elements. An element 902 is inserted into list 901 at intersection point 903 causing the elements below the insertion point to be "pushed" downward (an expected result of inserting an item into a list).

Figure 10:
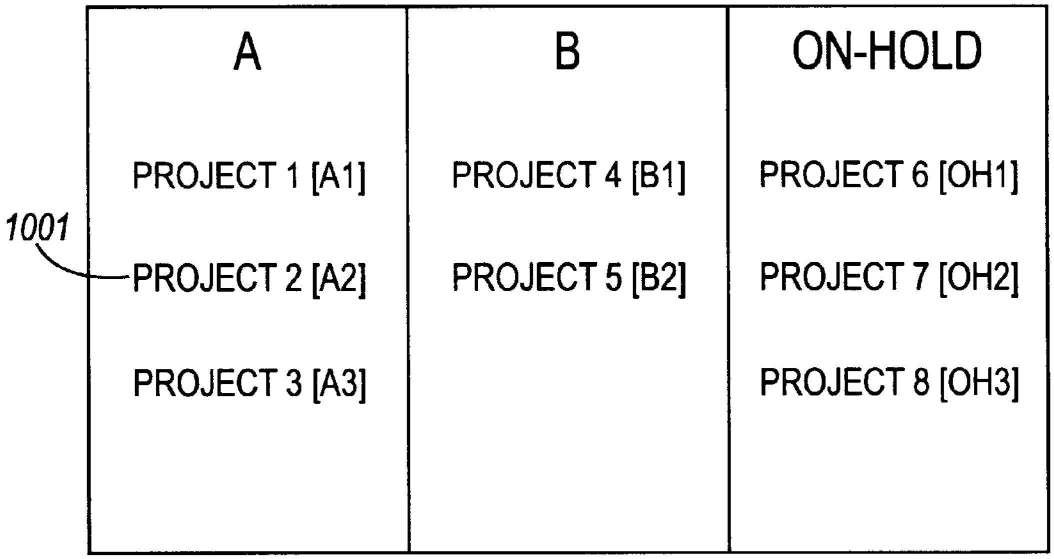
FIGS. 10–11 illustrate the determination of a value for an attribute of a domain object based on spatial position on the workspace of a freeform graphics system in the currently preferred embodiment of the present invention.
Figure 11:
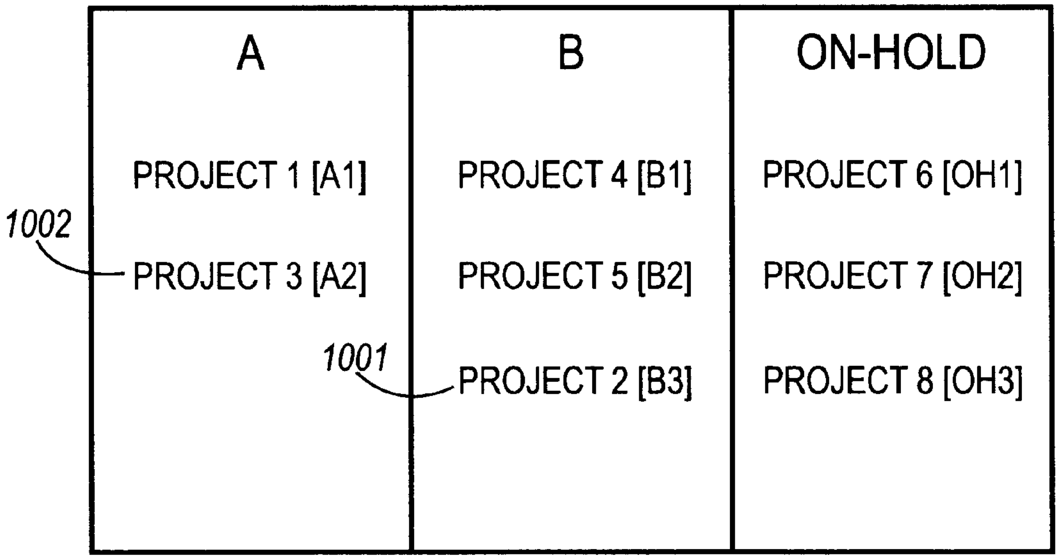

Given these structures, Tivoli can compute a variety of spatial relationships amongst or between icons, including:

icons in the same region or page icons in the same row or column (of rectangular regions)

icons in a given direction within the region (above, below)

icons next to in a given direction (above, below)

icons that are linked icons contained in a linked enclosure position of icons in a list icons which are physically touching Tivoli may use these spatial relationships for various arithmetic computations, for example:

summing a particular attribute value for domain objects having an icon in a region or page counting the number of icons in a region finding the icon representing the domain object with the maximum value from a collection of linked icons In addition to numeric computations, Tivoli can interpret the meaning of the spatial position of an icon. For example, consider a stack ranking application wherein there are domain objects representing projects and domain objects representing labels. This example is illustrated in FIGS. 10–11. Each project icon has a position on the ranking page in a list in a region with a label icon ("A", "B", "On Hold"). The "rank" value of each project is computed by an analysis of the spatial position of the project's icon. So the icon 1001 that is in the 2nd position of a grouping that is in the region with the label icon "A" is encoded as having the rank of "A2". Note that the rank for each icon is indicated at the right most pane of the icon. Referring to FIG. 11, moving the icon 1001 itself or other icons in the region or moving other icons into the region or the region label would cause the rank to be dynamically recomputed. Here the icon 1001 has been moved by a user dragging action to the third position in the region with the label icon "B", so that it now has rank "B3". Further it should be noted that the icon 1002 has moved up in the "A" region so that the icon 1002 now has rank "A2".

Finally, Tivoli can handle computations based on clock times. An action can contain a reference to current-time. At regular intervals, the system generates a time-update event, which changes the values of any domain object values referring to the current time, and these are propagated to other values that depend on them. This is an example of a system event. For example, a domain object representing an agenda item may contain an allotted-time attribute. When the agenda item is started, the current-time is recorded in its start-time attribute. For every time-update event, the agenda item has an action to compare the start-time+allotted-time with current-time+2 minutes, and, if it is greater, an output is generated (such as an audio bell) to signal that time is almost up.

This updating of attribute values is accomplished by the writing of domain object scripts.

Figure 12:
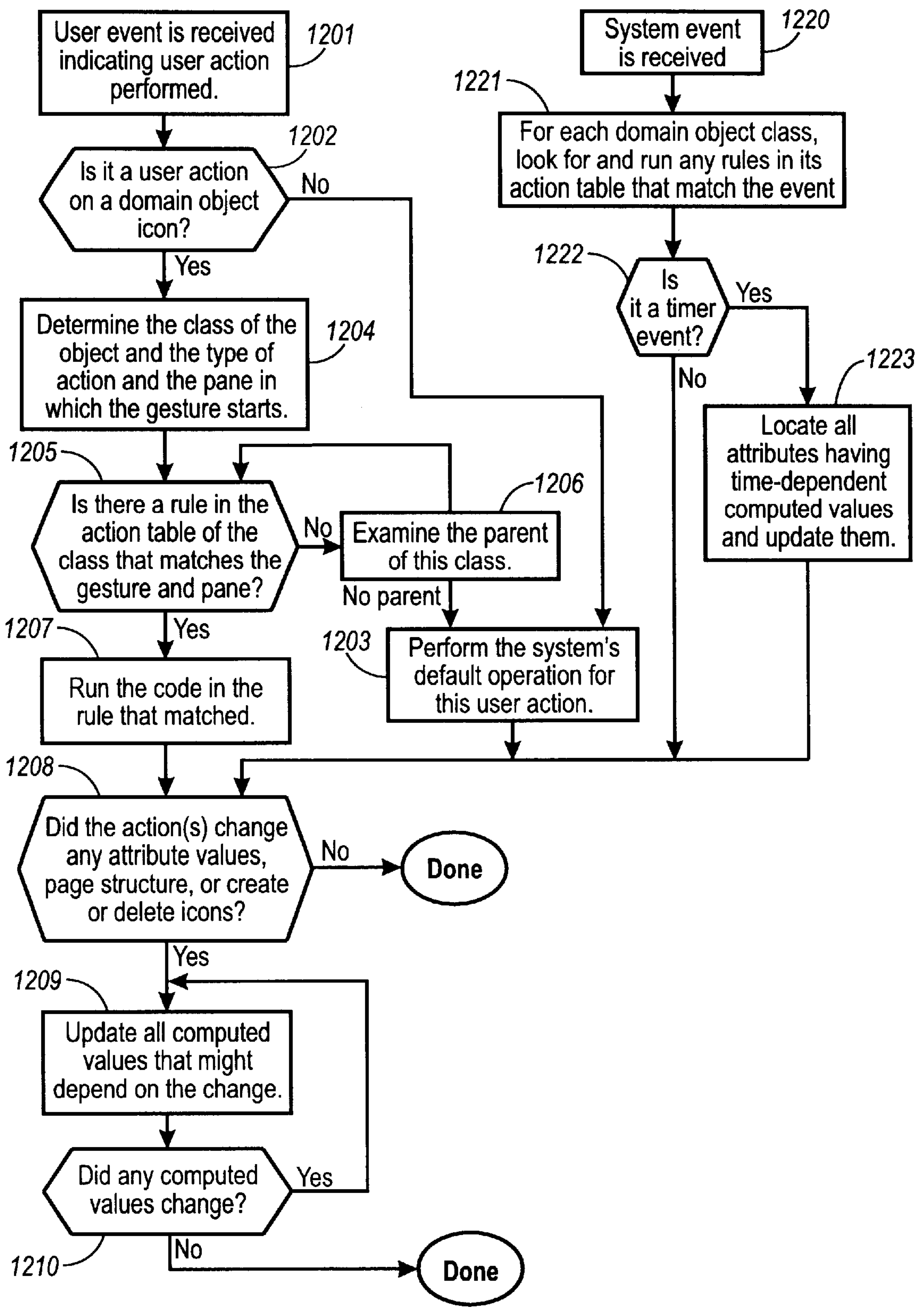
FIG. 12 is a flowchart illustrating the steps performed by the freeform graphics system when an event occurs (caused by a user action or by a process within the system) in the currently preferred embodiment of the present invention.

FIG. 12 describes the steps performed by the underlying graphics editing program when a system event or user action occurs.

In a graphics editing program, there are many types of user actions, such as drawing ink strokes, creating borders, typing text, or selecting a group of graphic objects. The most interesting type of action to consider here is a user action, e.g. a gesture on a domain object icon, as these actions are customizable per the domain object class definition. Referring to FIG. 12, the graphics editing program receives an indication that a user action has been performed, step 1201. The program then determines if the user action was performed on a domain object icon, step 1202. If it is determined that the user action was not performed on a domain object icon, a system default operation is performed for the user action, step 1203. If the user action was performed on a domain object icon, the type of the user action, the pane of the icon on which the user action originated and the class of the underlying object, are determined, step 1204. With this information, the program then consults the action table of the class, looking for a rule that matches the identified user action; i.e., a rule that mentions this pane (or "any pane") and specifies this action (or "any action") as its action, step 1205. If the graphics editing program does not find a matching rule in the object's own class, it recursively examines the parent of the class for a matching rule, step 1206. If a parent of the class exists, processing continues per step 1205 to see if a corresponding rule exists. If the graphics editing program reaches the top of the class hierarchy without finding a matching rule, it simply performs its normal behavior for this kind of action, just as if the graphic object had not been a domain object icon per step 1203. For example, the class might not define a rule for the "tap" gesture, but the global class inherited by all classes might define "tap" on any pane to mean "select the icon" (this is, in fact, the default in Tivoli).

If the graphics editing program finds a rule, it performs the corresponding operation by executing the corresponding code, step 1207. The code can perform any operation supported by the scripting language. In all cases of performing an operation, it is determined if the code does anything that might affect a computed value, such as changing an attribute value or the region structure of a page, or creating or deleting icons, step 1208. If it does then the graphics editing program updates (runs the code for) all computed values that depend on the change, step 1209. If any computed values change during this update pass, the program must recursively update the values of any computed values that depend on them, step 1210. The steps 1209 and 1210 will loop until all the dependent computed values have been calculated. Of course, a robust system will detect any circularities in the computed values, so as to avoid an infinite loop.

It should be noted that user actions other than gestures on an icon may be customizable per class. For example, dragging a selected set of graphic objects and "dropping" them on an icon is one kind of user action that there can be rules to handle. In this case, at the point at which the user "drops" the selection, the program determines the pane and class of the underlying icon, and searches as described above for a rule that specifies the action "drop".

System events might be internally generated, such as a real-time clock event, or externally, such as a notification from a network database that some data of interest to the program has changed. Referring back to FIG. 12, a system event is received, step 1220. A system event may not be immediately identifiable as belonging to any particular domain object class so in general, the program responds by searching the action tables of all active domain classes, looking for any rules that match the event. Then, as with user events, it runs the matching rules, step 1221 and updates any computed values that are dependent on changes made per step 1208.

The program might also have a default procedure for handling certain types of system events, for the ease of application programming. For example, in the case of a clock event, the program determines that it is a timer event, step 122, and then the program locates all computed values that rely on the current-time and updates them, step 1223. Locating time-dependent values will vary with the capabilities of the scripting language; the program might be able to automatically tag time-dependent values as they are computed and propagated, or it might require the application programmer to declare in the domain object class which attributes have time-dependent values.

As described earlier, any change to an attribute value for a domain object can be stored in a file that may be later transmitted back to the database.

Examples of Applications for Supporting Various Meeting Functions

The development of the present invention was motivated by trying to provide tools on an electronic whiteboard, such as the LiveBoard, that are finely tuned to a variety of different meeting practices. Described below are several specific domain object classes designed to support different types of meetings. The examples illustrate the different kinds of domain objects and interaction features of the present invention. It should be noted however that the present invention is not limited to tools for supporting meetings or to implementation on an electronic whiteboard.

Generic Operations on Domain Objects

The present invention is built on the idea that one can customize, by means of a scripting language, a set of specialized domain objects for particular uses. However, it is useful to have some consistency in the user interface for generic operations that are commonly needed across different applications. Some of the generic operations, and the user actions to invoke them, are as follows:

To select a domain object icon, tap on the icon.

To expand the information about a domain object, double-tap on the icon. This will result in another layout of the domain object being displayed as an overlay. Sometime it is useful to expand an icon to a somewhat larger version by replacing the original icon (not as an overlay). This is invoked by a right gesture (and a left gesture is used to replace the larger icon by a smaller one).

To document a domain object icon (such as its attribute-value structure or the customized actions on it will respond to), hold on the icon. This will result in a documentation layout being displayed on an overlay.

To create a new domain object icon, first create some content material on the display, such as by scribbling strokes with a pen, then create a box gesture around the material. This causes a new domain object and icon to be created with the boxed material being the value of the class-designated attribute of the new domain object. If a domain object of class C was selected at the time of the box gesture, then the new domain object is of class C; otherwise a "Thing" domain object is created, which can be changed to another class by tapping on the object and selecting the class from a menu.

To insert arbitrary material from the display, such as ink strokes, into an attribute of a domain object select the material and drag it to the pane of the icon corresponding to that attribute.

Domain objects can be scripted to execute different operations for the above actions or to use different actions to invoke the above operations, but scripting consistent behaviors conventions is useful.

General Purpose Domain Objects

In the development of these applications several domain object classes were found to be generally useful in many different meeting support applications. These domain object classes include:

Person. Represents information about a person, such as their phone number for contacting them and an attribute to record whether they are present at a meeting.

Agenda Item. Represents a topic for a meeting. Attributes include the topic, the discussant (a person), the time allocated.

Note. Represents a note taken by someone at the meeting, which might be taken on a portable device. The attributes include the note contents and the author.

Action Item. Represents an assigned action. Attributes include the action, the assignee and when it is due.

Thing. Represents an unclassified item, which can be later converted to a different domain object class.

Label. Represents a label that can be placed near other objects to tag them.

Vote. Represents a number of votes.

Item. Represents a phrase on a presentation slide. A user points to it to indicate that he is talking about the item.

Cost Item. Represents an item that has a cost. Attributes include the name and the cost.

Budget Center Summary. Represents a budget classification of a set of cost items. Attributes include the name, the budget target, the sum of the current cost items, and the variance.

Clock. Represents a clock and shows the current time or some relative time (such as the time since the beginning of the meeting).

Event. Represents a time interval during which an event occurs, such as the discussion of a particular topic.

Link. This is a function object, whose action is to jump to a specified domain object icon, usually on another page.

The particular content discussed at a given meeting can vary widely, and it is less clear what a useful classification would be, beyond the generic Thing. Thus the domains objects representing the content of specific meetings usually need to be customized.

These domain object classes and user actions can be mixed-and-matched to support various aspects of meeting activities. They are best understood in the context of particular meeting support applications and activities.

Budget Meeting

The tools for this kind of meeting are easiest to understand, because the created domain object class enables operation of the system as a "freeform spreadsheet." The goal of this kind of budget meeting is to arrange the cost items to fit the budgets. There are two main kinds of domain objects: cost items and budget center summaries.

The cost item class is defined in the scripting language as follows. First the attributes and values are defined:

default[name]: nil
default[cost]: nil
default[category]: nil
computed[bud-ctr]: (get-value name column bud-ctr-sum)

A cost item has four attributes: the name of the item, its cost, a category, and a budget center. Three of the attributes have no default value. The value of the budget center attribute is computed by finding a budget center summary domain object in the same column as the cost item and getting the value of its name attribute. Thus, when the cost item is moved to another column, it's budget center is recomputed to be a different budget center name. Note that this is an example of a computed value based on spatial positioning of domain object icons.

A cost item domain object has three different icon layouts:

layout[default]: '%1l (name)|%4r(cost)'
layout[fill]: '%(name) %N %(bud-ctr), category %(category)'
layout[doc]: 'COST ITEM %n
name|cost|category(hidden)%n
tap2→show full name and category %N
up on cost→+1K %N
down on down→−1K'

The default icon shows just the name and cost of the cost item in fixed-width panes, so that all default icons are the same size and they fit neatly into lists. However, the longer names will be truncated in the default icons. The full sized icons are sized to show the whole name, as well as the category. The documentation icon of a cost item is a literal string that describes the attributes of the cost item and the actions that can be performed on cost item icons.

The actions are specificed in action rules:

(default any hold (make-overlay 'doc))
(default any tap2 (make-overlay 'full))
(default cost up (set-value cost (+cost 1)))
(default cost down (set-value cost (−cost 1)))

The first rule in the action table specifies that on the default icon, in any pane, when the user performs a hold gesture, the system operation is to make a doc icon and display it as an overlay. Similarly, the second rule specifies that a double tap on any pane of the default icon causes a full size icon to be overlaid. The next two rules apply only to up or down gestures on the cost pane and specify that the cost value is to incremented (up) or decremented (down).

Budget center summary domain objects have four attributes:

default[name]: nil
default[target]: nil
computed[sum]: (sum cost local cost-item)
computed[variance]: (−sum target)

A budget center has a name, a target budget, a sum of currently assigned cost items, and a variance. The latter two attributes are computed. The sum is computed by finding all cost item icons in the local region of the budget center summary icon and summing their cost values. The variance is computed as the difference between the sum and the target.

There are two layouts for budget center summary icons:

layout[default]: '%(name)|%(sum)|%(target)|%(variance)'
layout[doc]: 'BUDGET CENTER SUMMARY %n
  name|*sum|budget|*variance %n
  up on name→change name %N
  up on budget→+5K %N
  down on budget→−5K'

The default layout shows the four attributes. The documentation layout explains the budget center summary object's attributes and actions.

The action rules are:

(default any hold (make-overlay 'doc))
(default target up (set-value target (+target 5)))
(default target down (set-value target (−target 5)))
(default name up (set-value name (next-value name bud-ctrs)))

The first rule specifies the conventional way to show the documentation. The next two rules allow the user to increment or decrement the budget target. The last rule allows the name of the budget center to be changed (by cycling through the names of all budget centers).

These two domain object classes can be used in specific budget meetings by setting up a TML file to lay out specific domain object icons when loaded into Tivoli. A partial TML file is as follows:

&&NColumns(4)
&&Column( )
&&color(blue)
&&ObjectIcon(bud-ctr-sum, name: CSA, budget: 40)
&&color(black)
&&skip(0.5)
&&ObjectIcon(cost-item,
  name: "Liveboard 3 ('94 actual)", cost: 21, category: 4)
&&ObjectIcon(cost-item
  name: "2 LB SVGA display", cost: 10, category: 4)
&&Column( )
&&color(blue)
&&ObjectIcon(bud-ctr-sum, name: DID, budget: 40)
&&color(black)
&&skip(0.5)
&&ObjectIcon(cost-item,
  name: "PC (G Govinda)", cost: 10, category: 5)
&&ObjectIcon(cost-item,
  name: "2 PCs (kh,ml)", cost: 15, category: 2)

Figure 13:
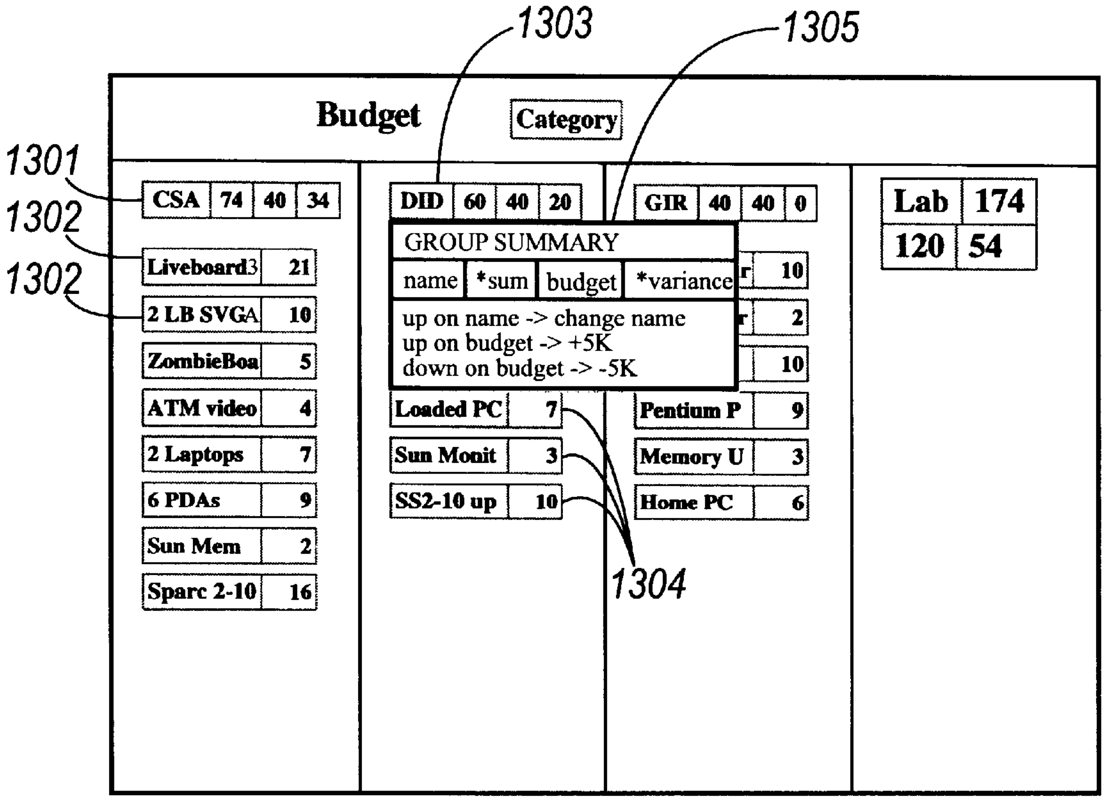
FIG. 13 illustrates the use of an overlay to describe the attributes and available user actions for a budget center summary domain object defined for a budget meeting application implemented on a freeform graphic system in the currently preferred embodiment of the present invention.

It specifies a page with 4 columns, each with a vertical list of domain object icons. The resulting page layout is shown in FIG. 13. When viewed on a color display, the first column contains a blue budget center summary icon 1301 for the "CSA" budget center, followed by several black cost item icons 1302, the first two of which are for a "Liveboard 3" and "2 LB SVGA display". The second column contains a budget center summary icon 1303 for "DID" and some cost item icons 1304. FIG. 13 also shows what happens when the user makes a hold gesture on the DID icon 1303—an overlay of the documentation layout is created 1305. The user can remove the overlay by tapping on it.

Figure 14:
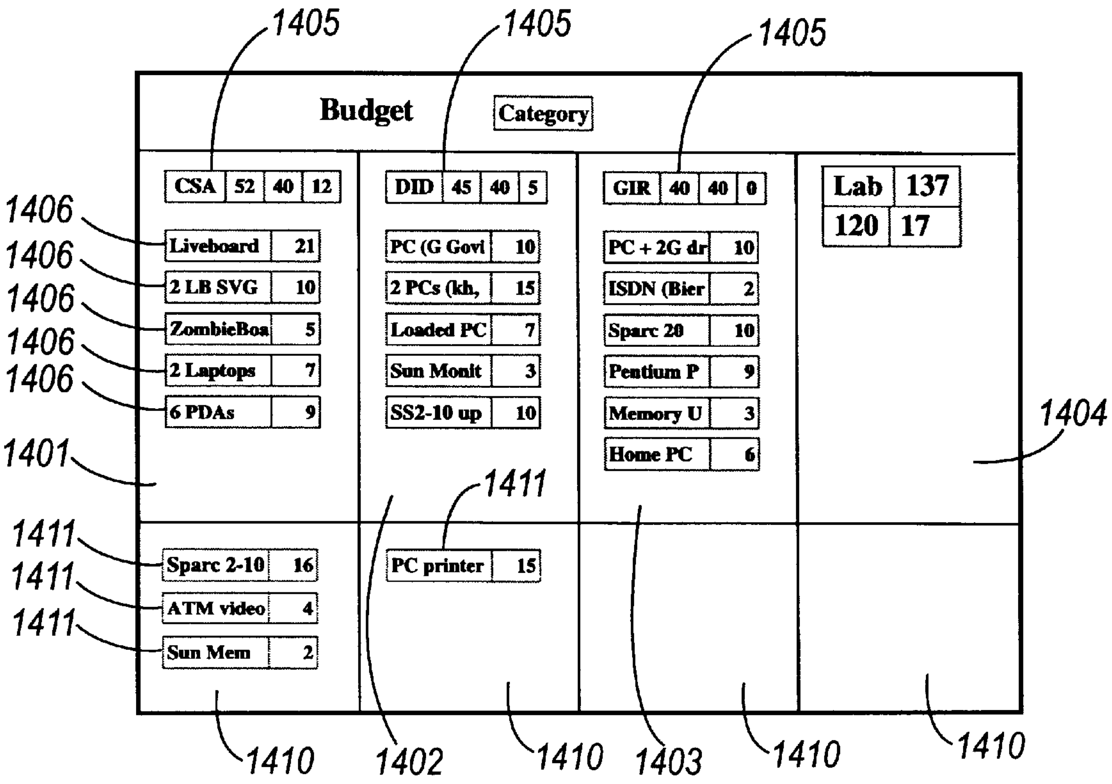
FIGS. 14–15 illustrates the use of cost item domain objects in a budget meeting application implemented on a freeform graphic system in the currently preferred embodiment of the present invention.
Figure 15:
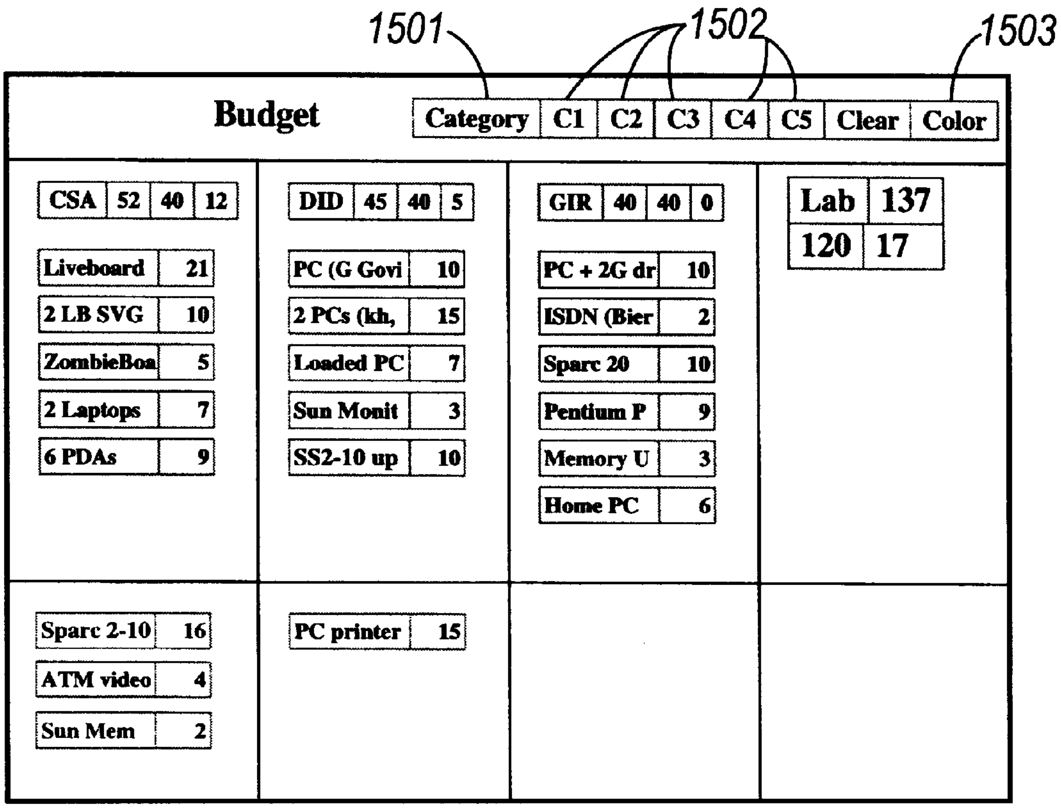

The way these domain objects and page layout are used in a budget application is shown in FIGS. 14–15. In this application, the workspace has defined regions 1401–1404. Regions 1401–1403 are used to organize by budget center, while region 1404 defines summary information for the organization. Contained within each region are a budget center summary icon 1405 and a plurality of cost item icons 1406. The budget center for each cost item is computed by finding the name of the budget center summary icon located in the same column. That is, a cost item belongs to a budget center if it is located in the same column as the budget center's icon. Thus, moving the icons between columns may move cost items between centers. A cost item may be removed from the budget sum by moving it to one of the lower regions 1410, where it is not included in the budget center summary (which only sums cost item icons in its local region). FIG. 14 shows some items 1411 removed from the budget in this way.

Further, in this example each cost item has a category number, which is understood by the meeting' participants (e.g. capital expense, operating expense, etc.). These category numbers are not displayed in the cost item icons, because they are a secondary consideration. However, there does come a time when it is useful to consider how items in different categories are distributed. A tool for this is the Category object, shown at the top of the page in FIG. 15. When the user gestures on the Category icon 1501, it expands to a "full-sized" icon with panes for the different categories 1502, plus a Color pane 1503. When the user taps on the Color pane, the designated color is changed (by cycling through a standard list of colors) and the Category icon itself is colored with the new designated color. The action rule for this is:

(fill color tap (set-value color (next-value color color-list))
  (set-color color))

When the user taps on a category pane 1502, such as C5, the following action rule is invoked:

(full C5 tap (set-color color page cost-item (eq category 5)))

The operation of this rule is that all cost-item icons on the page with category values of 5 have their color set to the currently designated color.

Thus, a budget negotiation meeting is supported by allowing users to move cost items around, adjust costs and targets, and examine category distributions.

Decision Making in Meetings

Decision making meetings are another common meeting type. Decision making meetings basically are concerned with evaluating and choosing among alternatives of some type. In the example described here, the alternatives are projects, represented by project domain objects; and the choice is which projects to fund within a predefined budget (expressed here as a percentage of a headcount).

FIG. 16 shows nine different project icons arranged in a list. The goal of the meeting is to decide which projects to fund within the given budget. The project object consists of a lot of information of different kinds, which is arranged in a long row in the default project icon. FIG. 16 also shows what happens when the user double-taps on the project icon 1602—an overlay 1601 is created showing an expanded version of the project information.

FIG. 17 illustrates selection of a project for funding. Two of the action rules for project objects are as follows:

(any number up (set-value status 'selected)
  (set-color 'red))
(any number down (set-value status nil)
  (set-color 'black))

Gesturing up or down on the number pane of any project icon sets the status attribute of the project object and colors the project icon to indicate the status (e.g., a selected project is shown in red).

FIG. 17 also shows a summary object 1703 above the project list. This domain object shows the total cost of all projects, the budget, and the cost of the currently selected projects 1703. The cost 1703 is dynamically computed by a summation operation. That is, whenever the status of any project is changed, the cost 1703 is recomputed.

FIG. 17 also illustrates some handwritten notations 1702 made with respect to the project icons. As will be described below, these handwritten notations maintain a structural relationship with the project icons that they are associated with.

It is often useful in meetings to sort the alternatives in different ways to better understand them. There are action rules for sorting according to different project attributes. For example:

(any intern up-down (sort intern alpha local project))

This rule specifies that an up-down gesture on the intern pane 1801 of any project icon causes all project icons in the local region to be sorted alphabetically according to the value of the intern attribute. FIG. 18 shows the results of this sorting operation.

Two interesting features can be noted here: first, the sort is done by Tivoli's implicit structure mechanism. Domain object icons are treated just like other Tivoli graphic objects, such as scribbled annotations. Comparing FIGS. 17 and 18 shows that the scribbles have been moved along with the project icons, because they are spatially associated with the icons in the list structure. Second, the sort action is animated. All the project icons are moved simultaneously at a perceptible speed. Thus, meeting members can see that a sort is taking place and can perceive how complex a sort it is.

Voting in Meetings

It is often useful to conduct a voting procedure during a meeting. The simplest kind of vote is to go around and let participants cast one or more votes for several alternatives. This is illustrated in the context of the previous decision-making meeting. FIG. 19 illustrates how this can be accomplished with a votecreation object and vote domain objects. Referring to FIG. 19, an "Add Voting" icon 1901 is positioned at the top of the page. Double-tapping on the Add Voting icon causes vote domain objects to be created, with one vote icon 1902 placed to the right of each of the project objects. The action rule for this is:

(default any tap2 (with-objects (page project)
  (new-icon (vote) 'default 'right)))

Vote domain objects have several action rules, including:

(any count up (set-value count (+(or count 0) 1)))
(any count down (set-value count (if (eq count 1) " " (–count 1))))
(any count up-down (sort count reverse-numeric local vote))

The vote object has a count attribute. The first two rules allow the user to increment and decrement count by up and down gestures on a vote icon. An up-down gesture on any vote icon causes all the vote icons in the local region to be sorted in high-to-low numeric order. This is the result illustrated in FIG. 19. Again, because the sort uses the implicit structure mechanism, the project icons (and the annotations) are carried with the vote icons as they are sorted.

Meeting Agenda Management generic function in meetings is to manage the meeting by an agenda, which is an ordered list of topics for discussion. An agenda is represented by one or more agenda item domain objects, which show the topics and the presenters/discussants. The agenda can be edited and reordered by deleting or dragging agenda item icons. A new agenda item can be created by scribbling a new topic and making a box gesture (as explained above under generic operations).

Figure 20:
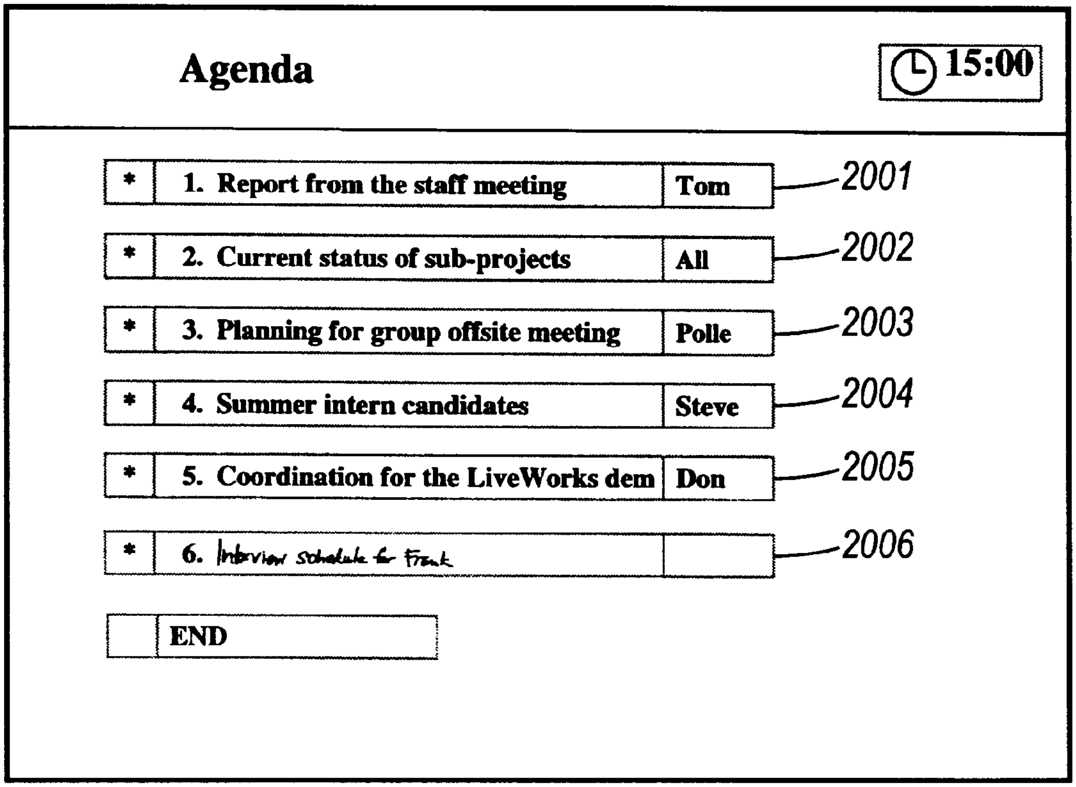
FIGS. 20–21 illustrate the use of agenda item domain objects in a meeting agenda management application implemented on a freeform graphic system in to the currently preferred embodiment of the present invention.

FIG. 20 illustrates an agenda created in such a fashion. Agenda item icons 2001–2006 are illustrated. Agenda item 2006 was created from scribbles on the board. The normal icon for an agenda item shows its sequence number, the topic, and the discussant, plus a special "button" pane on the left. The number attribute reflects the actual position of the agenda items in the list:

computed[number]: (list-position local agenda-item)

The button pane holds an attribute that encodes the status attribute of the agenda item:

computed[button]: (case status (pending "*") (active "!")
  (done " "))

When an agenda item is being discussed in the meeting, it is the "active" agenda item. Tapping the button pane of an agenda item icon causes that agenda item to become the active item. Several other operations also take place. The newly active agenda item icon is made visually distinct (e.g., a vivid color, such as red), and items that have already been discussed (status=done) are also made visually distinct (e.g. a subdued color, such as grey). If the agenda item tapped is not the next one in the agenda list after the currently active item, then the tapped item is moved up. Thus, the agenda item list is maintained in the order in which items were actually discussed.

Figure 21:
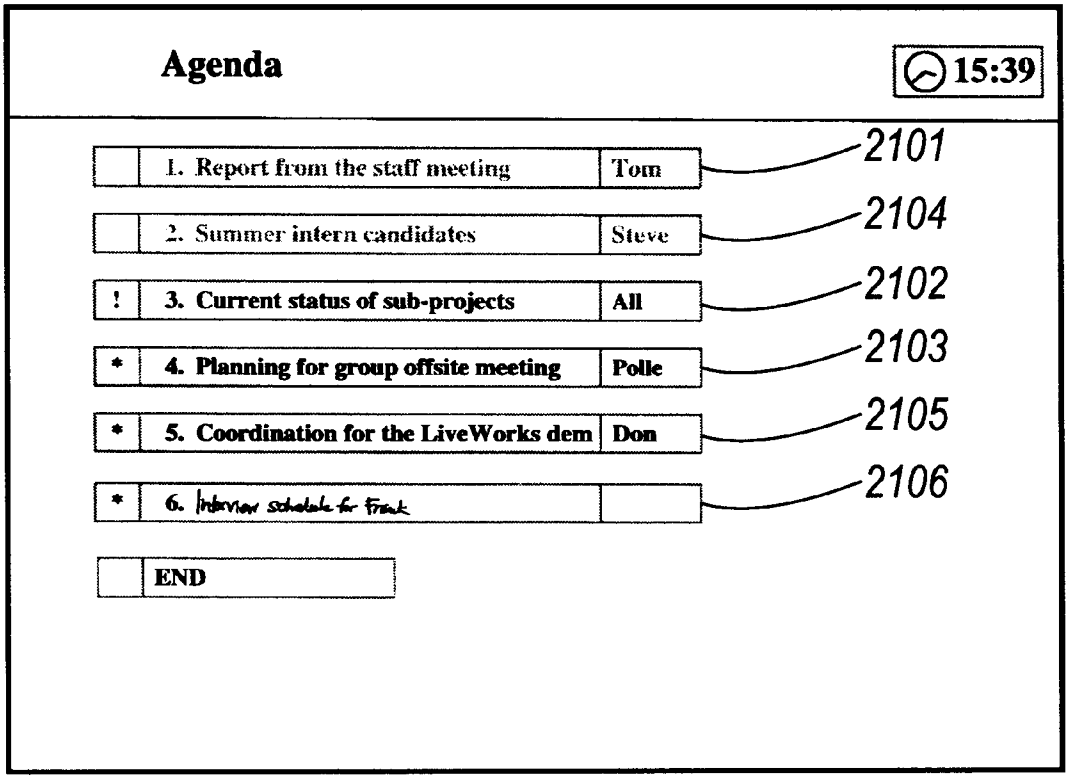

This is illustrated in FIG. 21. The first two agenda items (2101, 2104) are done, the third one 2102 is active, and the final three (2103, 2105, 2106) are pending. The agenda item that was originally fourth 2004 (in FIG. 20) was discussed second, and thus has been moved to second on the list 2104 (in FIG. 21). Note also that its number has been changed from 4 to 2.

When discussing an agenda item, it is useful to have a place to take notes on the discussion. An action rule is provided for this:

(normal button down (new-icon self 'title 'new-page-title)
  (jump self title))

Thus, when a user gestures down on the button pane of a normal action item icon, a new title icon for that action item domain object is created and positioned as the title of a new page; and the program jumps to the page where that title icon was placed. The users can then take notes on the discussion on this new page. When they are done with that agenda item, they can return to the agenda list page. The action rule is:

(title any up (jump self normal))

This specifies that by gesturing up on the title icon the program will jump to the place where the normal icon for the agenda item is, i.e., to the agenda page.

Meeting Time Management

Figure 22:
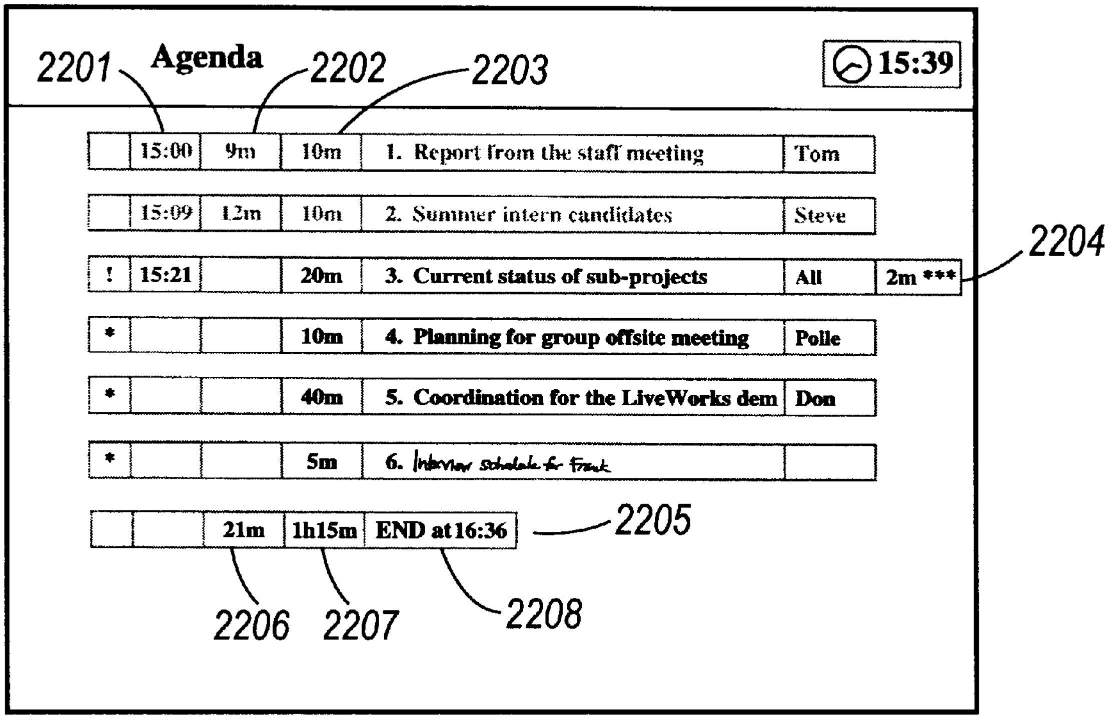
FIG. 22 illustrates the use of a clock domain object for use in various meeting applications implemented on a freeform graphic system in the currently preferred embodiment of the present invention.

Time management is another generic issue for meetings. One simple useful thing to do is to provide a clock. A clock domain object has an attribute that is computed dynamically from the system clock. The clock domain object has a current-time attribute that can be displayed to the users, such as shown in the top-right icon in FIGS. 20–22, as well as be accessed by other domain objects.

Time management is a useful feature for agendas. Agenda items are often given allotted times, so that the meeting time can be most effectively used. The agenda item icons can be expanded to show timing information. This is done by gesturing right on an agenda item:

(normal any right (set-layout 'timed local agenda-item))

This causes all agenda item icons in the local region to be expanded (see FIG. 22) to the "timed" layout, which exposes several additional attributes of the agenda items: the start time 2201, the actual duration 2202, and the allotted duration 2203. Gesturing up or down on the allocated duration pane can be used to alter the allotted duration. The start time and actual duration attributes are set when the user taps the button pane of an agenda item icon to signal the start of a new agenda item. These attribute values are computed by referencing the current-time of the clock object.

Another useful feature is to show the users how much time they have left on the currently active agenda item. When an agenda item is active, it uses a layout showing the time remaining on the right 2204. The remaining time attribute is computed dynamically from the start time, the allocated duration, and the current-time from the clock. Further, when the remaining time reaches a warning value (say, two minutes), this is signaled to the users by sounding an audio indicator (such as a bell) and a visual indicator (such as a "*" in the time remaining time pane 2204**).

Finally, it is useful to maintain a prediction of the overall meeting time. This is done by a time summary object 2205. This summary object shows the total time used for the completed agenda items 2206, the time allocated for the not yet completed agenda items 2207, and the predicted end time of the meeting 2208.

Another kind of time management support is in a meeting where many items have to be dealt with, for example, a program review committee meeting where many submissions have to be decided upon. It is not unusual for a program committee to have to process several hundred submissions. In this case a time summary object is used to keep track of the process. We assume there is an icon on the page for each submission to be processed and each submission is represented by a submission domain object. As each submission is decided, its status is changed from undecided to some decision (such as accepted or rejected). By keeping track of the number of submissions decided in time from the start of the meeting until the current-time, the average process time can be computed; then this can be used to compute the predicted end of the meeting by assuming the same average time for the undecided submissions. All of this can be computed as a by-product of the users interacting with the submission domain objects.

Keeping Track of Time in Meetings

Keeping track of the use of time in a meeting can be useful to cross correlate with other data. The basic concept is to divide up the meeting into a series of events, which can be represented by domain objects. A generic event has a start time, a finish time, an event type, and a descriptive title.

An example where events are computed is in a presentation meeting, in which slides are used to guide the presentation. A presentation slide is a page consisting of a set of "bullet" items. A slide can be represented by a page with a set of bullet item domain objects. The presenter goes through the presentation by touching (tapping on) bullet items as they are presented. When a bullet item is tapped, it highlights itself and marks a start time. When another bullet item is touched then the first bullet item is deactivated, and an event object is created to represent its activation interval. Thus, the presentation is characterized as a time series of events that document when each bullet was presented. Event objects are usually not displayed to the users, but are exported after the meeting to be used by other tools.

Another source of events is from timed agenda items. But any domain object can create events as a side-effect of interacting with them by scripting event creation operations in the action tables.

Events can serve as indices to the time course of a meeting. They can be useful for correlating with other data, such as an audio/video recording of the meeting. If one wants to replay the recording of a meeting when a particular agenda item was discussed, then the event for this agenda item will give the start and stop times of that discussion. Another correlation is to take timestamped notes from different meeting participants and use the time correlation to assign the notes to particular agenda items. A system for recording meetings and which may use such events as indices for subsequent replay is described in co-pending U.S. patent application Ser. No. 08/552,960 entitled "System For The Capture And Replay OF Temporal Data Representing Collaborative Activities", and which is assigned to the same assignee as the present application.

Attendance, Notetaking, and Action Items in Meetings

Figure 23:
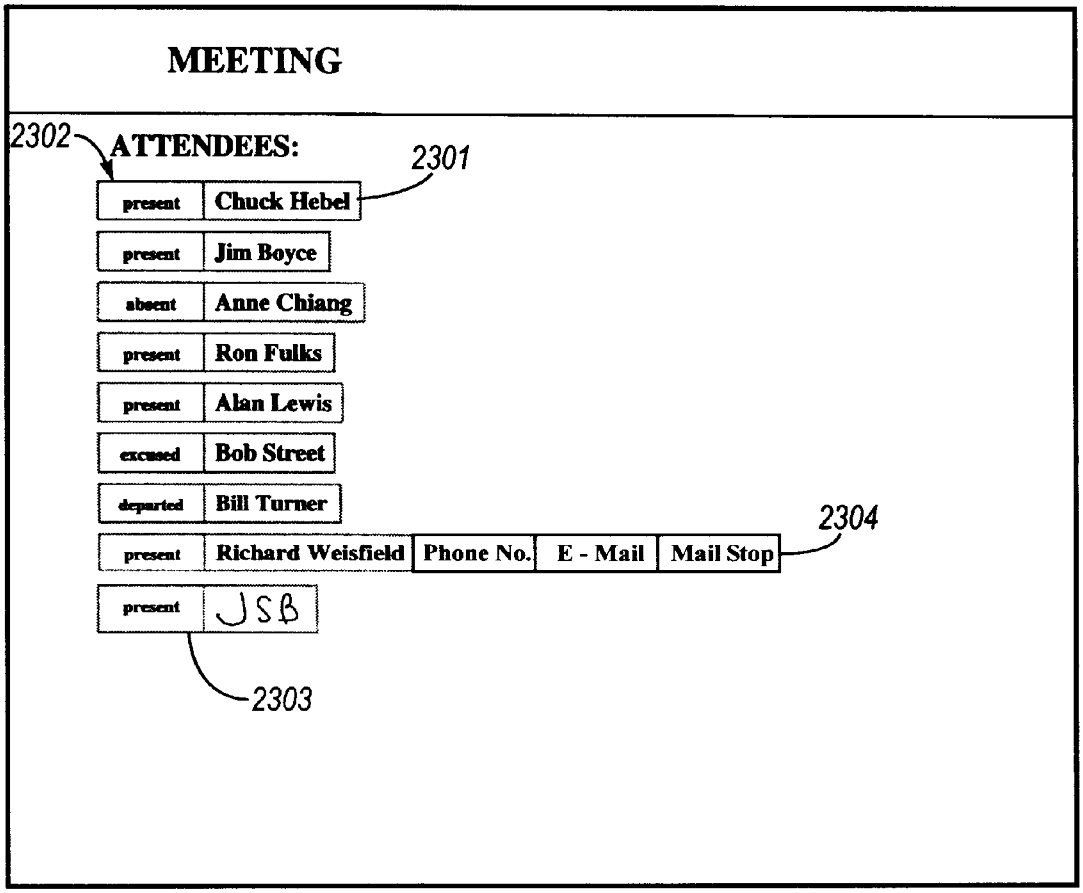
FIGS. 23–25 illustrates the use of person, note and action item domain objects for use in various meeting applications implemented on a freeform graphic system in the currently preferred embodiment of the present invention.

It is often useful to keep track of attendance at meetings. To support this, a person domain object is used. A person object has attributes for the person's name, some contact information (so the person can be called if they are not present), and an attendance status (present, absent, excused, departed). An example of an attendance page is shown in FIG. 23. The potential attendees are listed in person icons 2301. The status of a person can be changed by tapping on the status pane 2302 (which cycles through the various status values). Note that a new person object 2303 was created after scribbling the name. A right gesture expands the person icon 2304 to show the contact information if it is needed.

Figure 24:
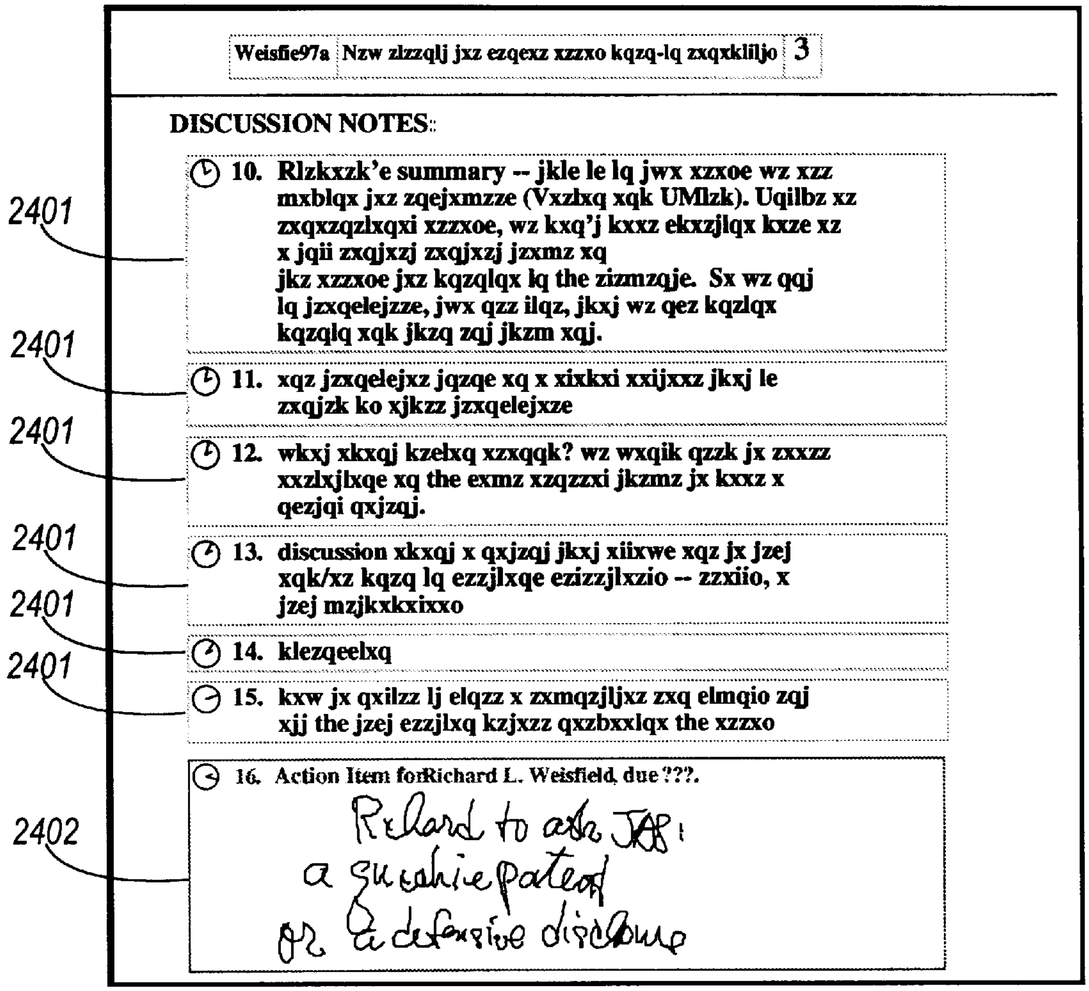

Notes can be taken during a meeting to capture various aspects of the discussion. Notes can be created on the LiveBoard, or they can be taken on a portable device, such as a laptop or PDA, either handwritten or typed. Notes can be represented as a series of note domain objects. A note object has a content attribute (either text or pen strokes), an author attribute (a person), a timestamp, and a sequence number. An example of notetaking as note objects is shown in FIG. 24. Note icons 2401 are shown in the bottom half of the page. These notes were taken by typing on a laptop. As each note was taken, its content, author, and time was "beamed" to the Liveboard, where it was converted to a note domain object and icon. The last note 2402 was taken on the Liveboard with a pen.

Action items are special kinds of notes that are particularly useful to record at meetings. The bottom icon 2402 is an action item domain object. It is like a note object, but with two additional attributes: an assignee (a person) and a due date. Each of these attributes can be changed by tapping on the respective part of the action item icon. Tapping on the assignee causes a menu of all persons in the attendee page to be brought up, and a new assignee can be picked from the menu.

Figure 25:
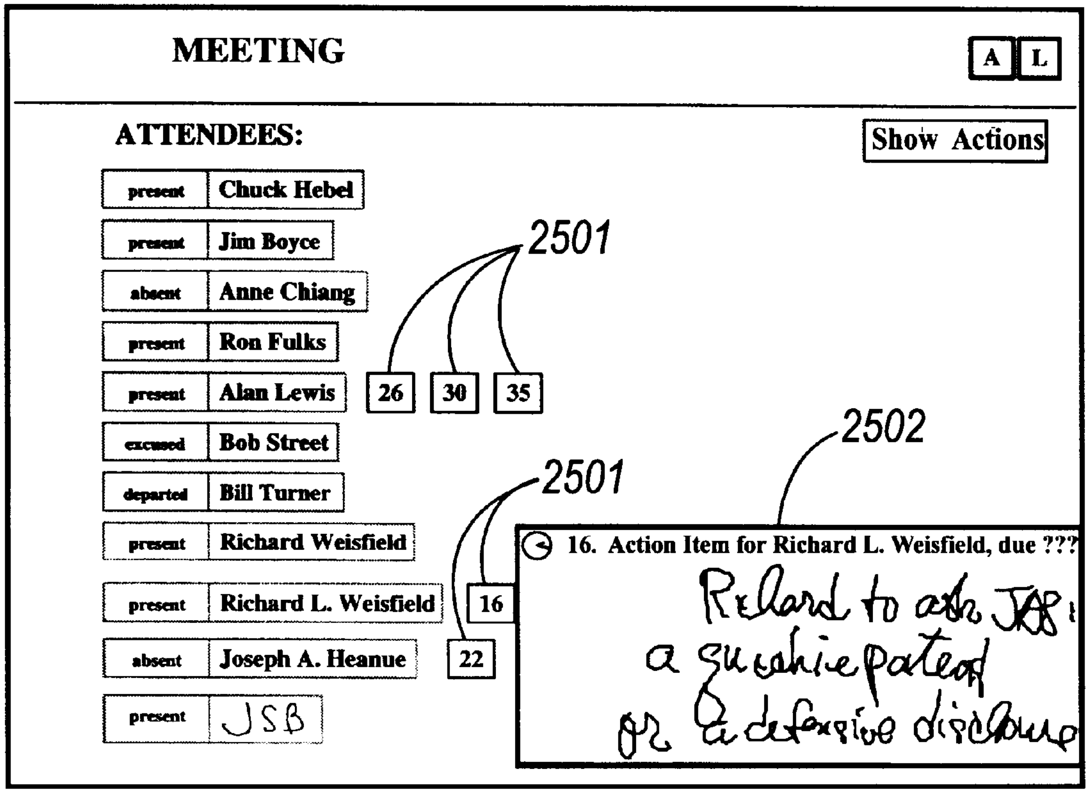

At the end of a meeting it is often useful to review the action items. The attendance page, which has a list of all the people is a useful place, to do this. For example, in FIG. 25 there is an icon called "Show Actions" 2505. Tapping on this icon causes all action item objects to be retrieved, small icons 2501 (containing only the sequence numbers) to be created and placed on the page next to their assignees. The result is shown in FIG. 25. Double tapping on an action item icon causes an overlay 2502 to be displayed showing the content of the action item. An action item can be reassigned by dragging the little icon onto a person icon, which assigns the action item to that person, and the little icon is repositioned to be next to the new assignee's person icon.

Action item objects captured and edited in this way can be exported to a database, where they can be managed and tracked. They can also be sent to users via email to remind them.

Supporting Brainstorm Meetings

A brainstorming meeting involves capturing a number of ideas on the workspace and then, more difficult, organizing them in some way—grouping them, consolidating them, relating them, etc. To support these activities, a few generic domain objects are defined and used. This type of meeting is different from the ones previously described in that the meeting begins with a "blank slate" and materials are created as the meeting progresses.

The basic generic domain object class for brainstorming is a "thing". Thing objects could be ideas, issues, arguments, project goals, candidates for hire, technologies to adopt, etc., whatever the particular topic of the brainstorm.

Things are placed on a freeform 2D workspace (analogous to pinning note cards on a wall bulletin board). Users are allowed to scribble freely on the workspace. Any set of scribbles can be converted to a thing object using the box gesture. Moreover, if a set of scribbles can be interpreted as a list structure, the box gesture creates a vertical list of thing objects, one "thing" object per list item.

Thing icons can be easily moved around by dragging, so that similar or related things can be arranged in proximity. It is often useful to label clusters of things, so a label object class has been defined. A useful function for label and thing objects is to be able to convert them to each other (i.e., change a thing to a label and visa versa), because users often misclassify objects or change their minds about the classification.

The Tivoli facilities for organizing materials can be used: arranging objects in lists, creating structured borders, drawing freeform enclosures around sets of objects, drawing links between enclosures or between objects, creating collapsed annotation objects, etc. Of course, the user can also just make arbitrary scribbles anywhere. One feature of the thing object is that it automatically computes a "labels" value by making a list of the names of all the labels in the same region as the thing.

Two other domain object classes are generically useful in this kind of meeting: person objects and vote objects. Person objects can be placed near objects or in enclosures to indicate authorship, responsibility, etc. Vote objects can be used as a tool for collecting opinions. Vote objects are created by selecting a set of thing objects and then tapping the "+V" object at the top of the page; this creates a vote icon next to each thing icon selected. If a set of thing icons with votes is confined within an enclosure or structured region, the things can be sorted by vote, as was seen in the earlier decision-making meeting example. In any event, this basic set of brainstorm objects is just a "starter set," which can be extended in many ways to compute various specialized relationships.

Figure 26:
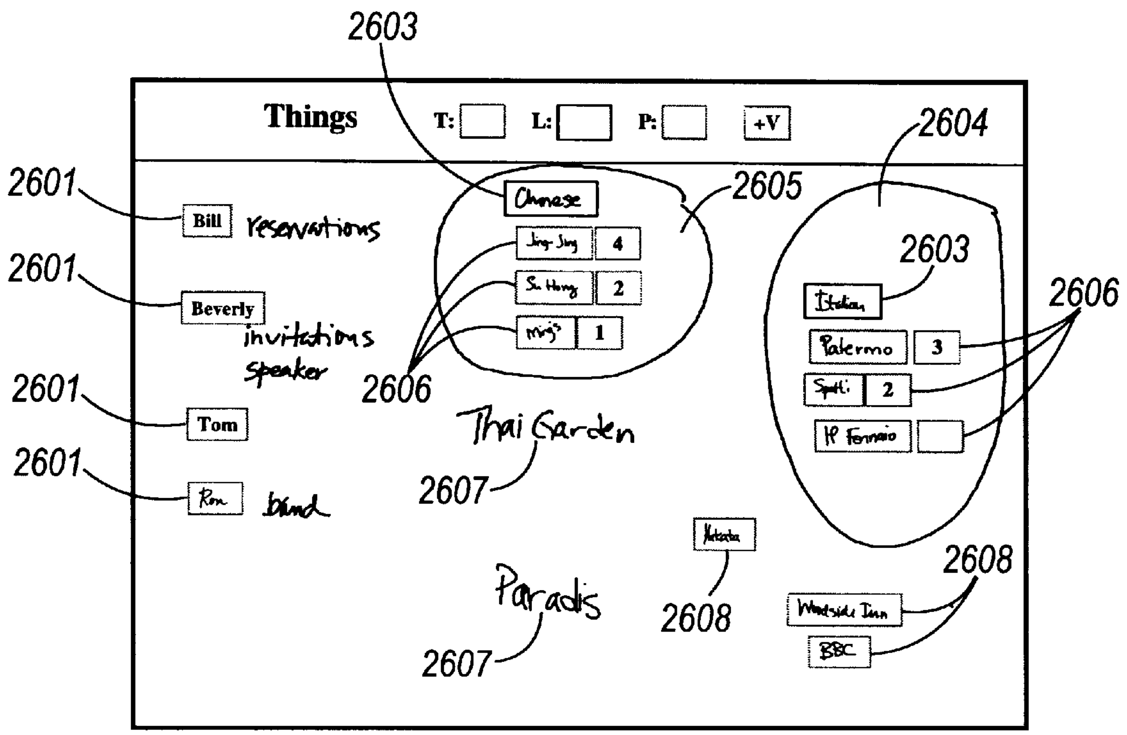
FIG. 26 illustrate the use of "thing" domain objects in a brainstorming meeting application implemented on a freeform graphic system in the currently preferred embodiment of the present invention.

FIG. 26 illustrates an example brainstorm page. Referring to FIG. 26, many ideas have been scribbled on the board and converted to objects. There are hand written annotations 2602 around the person objects 2601 that have not been converted. The hand written annotations in this example may indicate tasks whose responsibility for performance is identified by the corresponding "person" object. There are label objects 2603 having a solid border that name clusters of "thing" objects. Some clusters are enclosed into freeform regions, e.g. regions 2604 and 2605. There are vote objects 2606 placed next to the clustered "thing" objects. The clustered objects in regions 2604 and 2605 have been sorted by vote. Further note that the handwritten annotations 2607 may have been specifically left out of freeform region 2605 when it was decided to take a vote. The thing objects 2308 may have suffered a similar fate.

Thus, domain objects for use in a freeform graphics system are disclosed. While the present invention is described with respect to a preferred embodiment, it would be apparent to one skilled in the art to practice the present invention in alternative embodiments supporting freeform graphics systems and gesture based input. Such alternate embodiments would not cause departure from the spirit and scope of the present invention.

We claim:

1. A free form graphics system for handling domain objects in a free form manner, said domain objects providing a representation of information for performing an application specific task, said system comprising:

a display device for displaying domain object icons, said domain object icons representing instances of domain objects;

a user input device for enabling a user to manipulate said domain object icons in a free form manner;

domain object generation circuitry coupled to said display device and user input device, said domain object generation circuitry for creating one or more domain object icons from data in a database, layout selection information and domain object class definitions stored on a storage device, each of said one or more domain object icons being an instantiation of said domain object class that is defined by said domain object class definition, said domain object class definition specifying textual attributes representing information used to perform the application specific task, a set of action rules for performing operations responsive to an event, and one or more, each of said one or more layouts indicating a format for displaying at least one of the textual attributes as a domain object icon comprised of predetermined areas for displaying some or all of said attributes, and wherein the choice of said one or more layouts to be used is specified by said layout selection information; and event detection circuitry for detecting an event has occurred and causing operations corresponding to said event to be perfomed.

2. The freeform graphics system as recited in claim 1 wherein said event is detection of a user action that is associated with a domain object icon.

3. The freeform graphics system as recited in claim 2 wherein said user action is a gesture associated with said domain object icon, said gesture created using said input device.

4. The freeform graphics system as recited in claim 2 wherein said user action is associated with an operation that effects all domain objects in a database.

5. The freeform graphics system as recited in claim 2 wherein said user action is associated with a sort operation based on an attribute value of domain objects.

6. The freeform graphics system as recited in claim 2 wherein said user action is associated with an operation that causes a different layout to be used for generation of said domain object icon.

7. The freeform graphics system as recited in claim 2 wherein said user action is associated with an operation that causes an attribute value in said domain object to increment or decrement.

8. The freeform graphics system as recited in claim 2 wherein said user action is associated with an operation that causes an overlay to appear over the domain object icon associated with said gesture.

9. The freeform graphics system as recited in claim 8 wherein said overlay includes more information about said associated domain object.

10. The freeform graphics system as recited in claim 8 wherein said overlay includes a menu for performing different functions on said domain objects.

11. The freefrom graphic system as recited in claim 2 wherein said event is a system event that causes corresponding operations from said domain object class object definition to be performed.

12. The freeform graphic system as recited in claim 11 wherein said system event is clock event.

13. A method for operating a freeform graphics system to perform an application specific task comprising the steps of:

a) creating one or more domain objects used to perform the application specific task from data in a database and a domain object class definition stored on a storage device, each of said one or more domain objects being an instantiation of a domain object class that is defined by said domain object class definition, said domain object class definition specifying textual attributes representing information used to perform the application specific task, a set of action rules for performing operations responsive to an event, and one or more layouts, each of said one or more layouts indicating a format for displaying at least one of the textual attributes as a domain object icon that is comprised of predetermined areas for displaying some or all of said attributes;

b) generating display information and displaying said one or more domain objects as domain object icons on a display coupled to said freeform graphics system, said display information generated based on one of said one or more layouts specified in said domain object class definition;

c) detecting that an event has occurred;

d) identifying an action rule associated with said event based on the set of action rules specified in said domain object class definition for said one of said displayed domain objects; and e) performing an operation associated with said identified action rule.

14. The method as recited in claim 13 wherein said step of detecting that an event occurred is further comprised of the step detecting that a user action has been performed.

15. The method as recited in claim 13 wherein said step of detecting that an event occurred is further comprised of the step detecting that a system event has occurred.

16. A program storage device readable by a machine, tangibly emobodying a program of instructions executable by the machine to perform method steps for operating a freeform graphics system to perform an application specific task, said method comprising the steps of:

a) creating one or more domain objects used to perform the application specific task from data in a database and a domain object class definition stored on a storage device, each of said one or more domain object class instantiation of a domain object class that is defined by said domain object class definition, said domain object class definition specifying textual attributes, a set of action rules for performing operations responsive to an event, and one or more layout, each of said one or more layouts indicating a format for displaying at least one of the textual attributes as a domain object icon comprised of predetermine areas fir displaying some or all of said attributes;

b) generating display information and displaying said one or more domain objects as domain object icons on a display coupled to said freeform graphics system, said display information generated based on one of said one or more layouts specified in said domain object class definition;

c) detecting that an event has occurred;

d) identifying an action rule associated with said event based on the set of action rules specified in said domain object class definition for said one of said displayed domain objects; and e) performing an operation associated with said identified action rule.

* * * * *